US011849368B2

(12) United States Patent
Ruth et al.

(10) Patent No.: US 11,849,368 B2
(45) Date of Patent: *Dec. 19, 2023

(54) APPARATUS AND METHOD FOR CONTAINER LABELING

(71) Applicant: MOTOGO, LLC, Austin, TX (US)

(72) Inventors: David Brian Ruth, Austin, TX (US); Yuan-Chang Lo, Austin, TX (US)

(73) Assignee: Motogo, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,015

(22) Filed: Jul. 12, 2022

(65) Prior Publication Data
US 2022/0345848 A1    Oct. 27, 2022

Related U.S. Application Data

(63) Continuation of application No. 16/373,497, filed on Apr. 2, 2019, now Pat. No. 11,395,098.

(60) Provisional application No. 62/652,054, filed on Apr. 3, 2018.

(51) Int. Cl.
*H04W 4/024* (2018.01)
*G06Q 10/0833* (2023.01)
*H04W 4/029* (2018.01)

(52) U.S. Cl.
CPC ........ *H04W 4/024* (2018.02); *G06Q 10/0833* (2013.01); *H04W 4/029* (2018.02)

(58) Field of Classification Search
CPC ....... H04W 4/024; H04W 4/029; H04W 4/35; G06Q 10/0833
See application file for complete search history.

(56) References Cited

U.S. PATENT DOCUMENTS

| 9,595,018 B2 | 3/2017 | Carvajal |
| 10,327,108 B1 | 6/2019 | Knas et al. |
| 10,935,382 B2 | 3/2021 | Holden et al. |
| 2004/0098272 A1 | 5/2004 | Kapsis et al. |
| 2005/0046584 A1* | 3/2005 | Breed ............ G01S 7/4802 340/13.31 |
| 2006/0208169 A1* | 9/2006 | Breed ............ G01S 17/88 250/221 |
| 2006/0265233 A1 | 11/2006 | Mundy |

(Continued)

FOREIGN PATENT DOCUMENTS

| CN | 106845597 A | 6/2017 |
| EP | 0585932 B1 | 1/2000 |

(Continued)

*Primary Examiner* — Donald J Wallace
*Assistant Examiner* — Jalal C Coduroglu
(74) *Attorney, Agent, or Firm* — Moore Intellectual Property Law, PLLC

(57) ABSTRACT

An apparatus includes a communication device affixed to or placed within a transport container. The apparatus further includes processing circuitry configured to initiate display, via the communication device, of first routing information indicating a first destination along a geographic route from a first location to a second location and to, in response to a condition indicating movement of the container from the first location to an intermediate location, initiate display, via the at least one communication device, of second routing information indicating a second destination or a final destination that is different than the first destination.

20 Claims, 14 Drawing Sheets

(56) References Cited

U.S. PATENT DOCUMENTS

| | | | |
|---|---|---|---|
| 2008/0164251 A1* | 7/2008 | Fawley | B65D 88/128 |
| | | | 414/800 |
| 2012/0209619 A1 | 8/2012 | Knotts et al. | |
| 2014/0129135 A1 | 5/2014 | Holden et al. | |
| 2014/0288868 A1 | 9/2014 | Gorham, Jr. | |
| 2015/0046364 A1* | 2/2015 | Kriss | G06Q 10/0833 |
| | | | 705/333 |
| 2016/0019497 A1* | 1/2016 | Carvajal | H04L 67/104 |
| | | | 705/333 |
| 2017/0032586 A1 | 2/2017 | Cheatham, III et al. | |
| 2017/0337510 A1 | 11/2017 | Shroff et al. | |
| 2019/0306663 A1 | 10/2019 | Ruth et al. | |

FOREIGN PATENT DOCUMENTS

| | | |
|---|---|---|
| KR | 20110130415 A | 12/2011 |
| WO | 2004095225 A2 | 11/2004 |
| WO | 2005119544 A1 | 12/2005 |
| WO | 2009035694 A1 | 3/2009 |
| WO | 2014074319 A1 | 5/2014 |
| WO | 2015171825 A1 | 11/2015 |
| WO | 2017199225 A1 | 11/2017 |

\* cited by examiner

APPARATUS AND METHOD FOR CONTAINER LABELING

CROSS-REFERENCE TO RELATED APPLICATION

The present application claims priority from U.S. patent application Ser. No. 16/373,497, filed Apr. 2, 2019, entitled "APPARATUS AND METHOD FOR CONTAINER LABELING," which claims priority to U.S. Provisional Application No. 62/652,054, filed Apr. 3, 2018, entitled "APPARATUS AND METHOD FOR AUTONOMOUS CONTAINER LABELING," each of which is incorporated by reference herein in its entirety.

TECHNICAL FIELD

This disclosure relates generally to transporting items using intelligent transport containers. More specifically, this disclosure relates to an apparatus and method for container labeling of intelligent transport containers.

BACKGROUND

In recent years, consumers have been purchasing more products on-line. Items purchased on-line are often delivered directly to consumers at their residence. When a package is delivered and no one is present to receive it, the package is exposed and vulnerable to theft. Further, when the contents of a package arrive damaged, it is often difficult to ascertain how and when the damage occurred. Damage could have occurred during shipping, for example, due to poor handling. Additionally, or alternatively, damage could have occurred after delivery, for example, by someone attempting to steal a package that was left unattended by the recipient's front door.

SUMMARY

This disclosure provides apparatus and methods for container labelling (e.g., autonomous container labelling) of an intelligent transport container.

An apparatus according to the disclosure includes at least one communication device configured to be coupled to a container (e.g., a transport container). In example implementations, the at least one communication device is affixed to an exterior surface of the container or placed within an interior region of the container. In a particular implementation, the apparatus includes processing circuitry configured to initiate display, via the at least one communication device, of first routing information indicating a first destination along a geographic route from a first location to a second location and, in response to a condition indicating movement of the container from the first location to an intermediate location, initiate display, via the at least one communication device, of second routing information indicating a second destination or a final destination that is different than the first destination.

The condition may indicate that the container is located at the intermediate location, and the processing circuitry may be configured to detect the condition and to initiate the display of the second routing information in response to detecting the condition. The apparatus may further include an electronic label affixed to an exterior surface of the container, where the electronic label is configured to display the first routing information but not the second routing information at a first time and to display the second routing information but not the first routing information at a second time.

The at least one communication device may be configured to transmit one or both of the first routing information and the second routing information to an electronic device for display. The first routing information may include code that indicates address or location information not included in the second routing information, and the second routing information may include text indicating address or identity information not included in the first routing information. The first routing information may indicate the intermediate location, and the second routing information may indicate the final destination. The processing circuitry may be configured to generate the second routing information in response to detecting, via a location sensor, that the container is at or near the intermediate location.

The processing circuitry may be included in a controller of a smartbox or coupled to an existing package (e.g., to add smartbox structure and/or capability to a conventional package as described and referenced herein) and may be further configured to store, in a memory at the smartbox, information indicating the first destination, the second destination, and the geographical route. The processing circuitry may be configured to change the geographic route in response to a detected condition associated with traffic, a vehicle condition, or a payload condition. The processing circuitry may further be configured to, in response to detecting a change in one or more of the first destination, the second destination, or the geographical route, communicate with a remote system and change information to indicate one or more of a different first destination, a different second destination, or a different geographical route.

A method according to the disclosure includes initiating display, via at least one communication device at processing circuitry of a container, of first routing information indicating a first destination along a geographic route of the container from a first location to a second location and, in response to detecting movement of the container from the first location to an intermediate location, initiating display, via the at least one communication device, of second routing information that indicates a second destination or a final destination different than the first destination. The method may include detecting the movement of the container from the first location to the intermediate location based on receiving, at the processing circuitry, sensor information indicating that the container is at the intermediate location. The sensor information may include location information, and the display of the second routing information may be initiated in response to detecting the movement. The first destination may be the intermediate location, and the at least one communication device may be configured to display, at a surface of the container, a unique identifier (ID). The processing circuitry may further be configured to determine the geographic route, from a current location of the container to a location of the final destination, based on one or both of a communication link with a remote system and received transportation information.

The transportation information may include the first routing information, and the processing circuitry may be configured to initiate display of the transportation information via the at least one communication device. The processing circuitry may be configured to store information associated with the geographical route and to deploy (e.g., deploy or initiate deployment of) the container from the current location along the geographic route based on the stored information. A device according to the disclosure may store instructions that, when executed, cause a processor to perform any combination of the above operations or steps.

In a first illustrative embodiment, a transport container is provided. The transport container includes a body having a base, a cover, an opening, and at least one side wall all defining a cavity therebetween. The transport container also includes a unique identifier (ID) positioned on a surface of the body. The transport container further includes an electronic controller. When the electronic controller has received the ID, the electronic controller is configured to determine a geographic route from a current location to a destination location based on received transportation information. When the electronic controller has received the ID (e.g., through a user interface and/or an optical sensor), the electronic controller is also configured to display the transportation information on the user interface. When the electronic controller has received the ID, the electronic controller is further configured to deploy the transport container from the current location along the geographic route. The electronic controller may be configured to receive the transportation information from a handset wirelessly via a transceiver, through a wire detachably connected to each of a data port (of the transport container), the electronic controller, and the handset, through the user interface, through a biometric sensor of the transport container, or from another transport container. The electronic controller may be configured to receive biometric information via the biometric sensor and to identify at least a portion of the transportation information based on the biometric information.

The electronic controller may be configured to, when a cover of the container is in an open state and the electronic controller has received the ID, determine the geographic route from the current location to the destination location based on the received transportation information, display the transportation information on the user interface, and deploy the transport container from the current location along the geographic route. The transport container may include a cover lock adjustable between a locked state and an unlocked state. The cover lock may be configured to, in the unlocked state, permit the cover to move between a closed state and the open state. The transport container may comprise a locking bar adjustable between a bar locked state and a bar unlocked state. The locking bar may be configured to, in the bar locked state, lock the base of the transport container to one or more anchor points and restrict mobility of the transport container.

In a second illustrative embodiment, a method implemented by an electronic controller of a transport container is provided. The method includes receiving, by the electronic controller, transportation information. The method also includes receiving, by the electronic controller, a unique identifier (ID) that is unique to the transport container. The method further includes determining, by the electronic controller, a geographic route from a current location to a destination location based on the transportation information when the electronic controller has received the ID. In addition, the method includes displaying, by the electronic controller, the transportation information on a user interface when the electronic controller has received the ID. The method also includes deploying, by the electronic controller, the transport container from the current location along the geographic route when the electronic controller has received the ID.

The method may comprise determining, by the electronic controller, that the cover is in the open state. The method may further comprise, after the ID has been received by the electronic controller and the electronic controller has determined that the cover is in the open state, determining, by the electronic controller, the geographic route from the current location to the destination location based on the transportation information, displaying, by the electronic controller, the transportation information on the user interface, and deploying, by the electronic controller, the transport container from the current location along the geographic route. The method may comprise determining, by the electronic controller, that the locking bar is in the locked state. The method may further comprise, after the ID has been received by the electronic controller and the electronic controller has determined that the locking bar is in the locked state, determining, by the electronic controller, the geographic route from the current location to the destination location based on the transportation information, displaying, by the electronic controller, the transportation information on the user interface, and deploying, by the electronic controller, the transport container from the current location along the geographic route.

In a third illustrative embodiment, a transport container is provided. The transport container includes a body having a base, a cover, an opening, and at least one side wall all defining a cavity therebetween. The transport container also includes an electronic controller. The electronic controller is configured to determine a geographic route from an initial location to a destination location based on transportation information received from a mobile device. The electronic controller is also configured to display the transportation information on a user interface. The electronic controller is further configured to deploy the transport container from the initial location along the geographic route. The occupancy status may comprise one of occupied, unoccupied, or scheduled to be occupied. The electronic controller may be configured to abstain from deploying the transport container from the initial location along the geographic route in response to determining that the occupancy status of the cavity is occupied or scheduled to be occupied. The transport container may comprise a transceiver, and the electronic controller may be configured to wirelessly receive each of a location of one or more other transport containers, a current scheduled geographic route of the one or more other transport containers, and a cavity occupancy status of the one or more other transport containers via the transceiver. The electronic controller may be configured to deploy the transport container from the initial location along the geographic route toward the destination location based on the occupancy status of the cavity, the location of the one or more other transport containers, the current scheduled geographic route of the one or more other transport containers, and the cavity occupancy status of the one or more other transport containers.

In a fourth illustrative embodiment, a method implemented by an electronic controller of a transport container is provided. The method includes receiving, by the electronic controller, transportation information from a mobile device. The method also includes determining, by the electronic controller, a geographic route from an initial location to a destination location based on the transportation information. The method further includes displaying, by the electronic controller, the transportation information on a user interface. In addition, the method includes deploying, by the electronic controller, the transport container from the initial location along the geographic route. The electronic controller may deploy the transport container from the initial location along the geographic route toward the destination location after determining that the occupancy status of the cavity is unoccupied.

In a fifth illustrative embodiment, a transport container is provided. The transport container includes a body having a base, a cover, an opening, and at least one side wall all defining a cavity therebetween. The transport container also includes an electronic controller. The electronic controller is configured to determine a geographic route from an initial location to a destination location based on received transportation information from one of a handset, another transport container, or a user interface. The electronic controller is also configured to display the transportation information on the user interface. The electronic controller is further configured to deploy the transport container from the initial location along the geographic route.

In a sixth illustrative embodiment, a method implemented by an electronic controller of a transport container is provided. The method includes receiving, by the electronic controller, transportation information from one of a handset, another transport container, or a user interface. The method also includes determining, by the electronic controller, a geographic route from an initial location to a destination location based on the transportation information. The method further includes displaying, by the electronic controller, the transportation information on a user interface. In addition, the method includes deploying, by the electronic controller, the transport container from the initial location along the geographic route.

In a seventh illustrative embodiment, a non-transitory computer-readable medium includes program code, which when executed by a processor, causes a transport container to receive transportation information, receive a unique identifier (ID) that is unique to the transport container, determine a geographic route from a current location to a destination location based on the transportation information, display the transportation information on a user interface, and deploy the transport container from the current location along the geographic route.

In an eighth illustrative embodiment, a non-transitory computer-readable medium includes program code, which when executed by a processor, causes a transport container to receive transportation information, determine a geographic route from an initial location to a destination location based on transportation information received from a mobile device, display the transportation information on a user interface, and deploy the transport container from the initial location along the geographic route.

In a ninth illustrative embodiment, a non-transitory computer-readable medium includes program code, which when executed by a processor, causes a transport container to receive transportation information, determine a geographic route from an initial location to a destination location based on the transportation information from one of a handset, another transport container, or a user interface, display the transportation information on a user interface, and deploy the transport container from the initial location along the geographic route.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 14, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
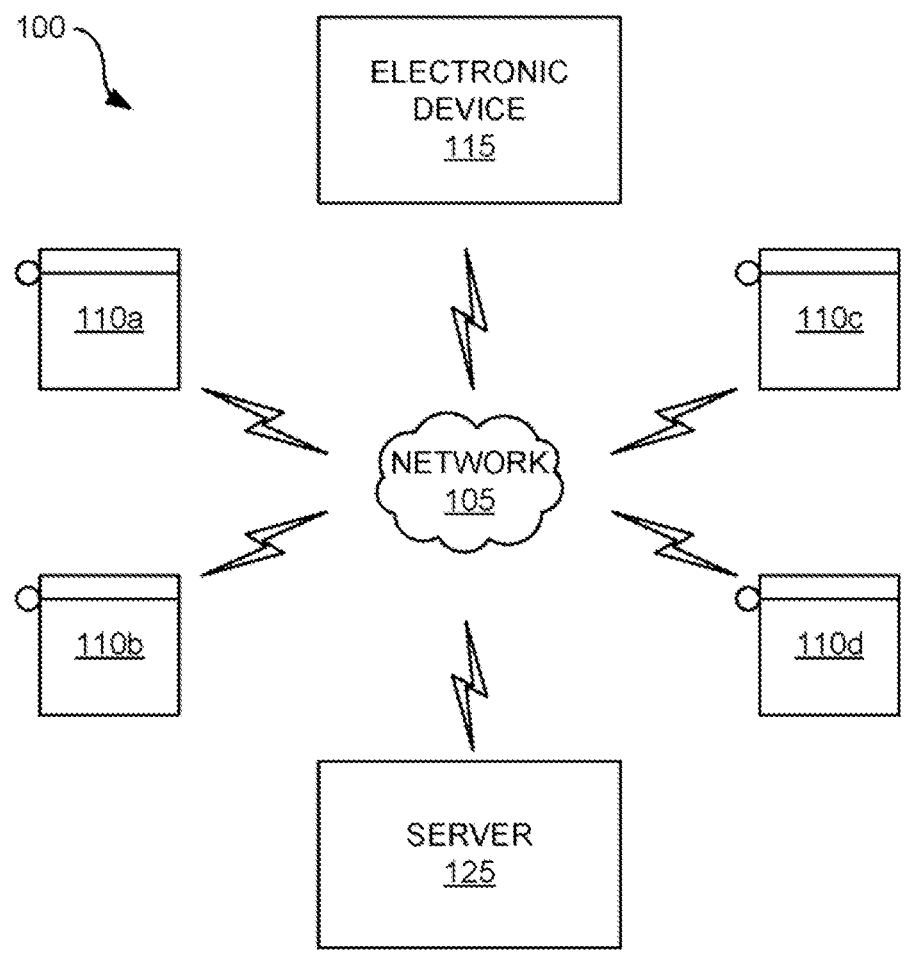
FIG. 1 illustrates a non-limiting, example network context for operating a transport container according to certain embodiments of this disclosure.

FIG. 1 illustrates a non-limiting, example network context 100 for operating a transport container according to certain embodiments of this disclosure. One or more components of the network context 100 may operate as separate components linked by one or more constituent networks of the network 105. In some embodiments, one or more constituent networks of the network 105 may include the internet, which can be accessed over both wired connections (such as at an Ethernet connection provided in, for example, a warehouse, a charging point for a smartbox or a transport container, a staging location for a smartbox, a transport container, or in a delivery vehicle) or over a wireless connection (for example, a wireless local area network "WLAN" connection or a cellular network). Additionally, or alternatively, one or more constituent networks of the network 105 may include a combination of private networks (such as a local wireless mesh network) and public networks (such as a telephone (POTS) network). According to certain embodiments, one or more constituent networks of the network 105 may support multiple communication protocols, including both wireless protocols (for example, BLUETOOTH®, circuit-switched cellular, 3G, LTE or WiBro) and internet protocols (such as HTTP). BLUETOOTH® is a registered trademark of Bluetooth SIG, Inc. of Kirkland, Wash.

In some embodiments, the network context 100 may, according to certain embodiments, include one or more transport containers 110 (such as transport containers 110a, 110b, 110c, and 110d). As discussed herein, the transport containers 110 may generally include a body defining a cavity that is configured to retain packages, parcels, or other items therein for transport. The one or more constituent networks of the network 105 provide two-way connectivity between the transport containers 110. In certain embodiments, the one or more constituent networks of the network 105 provide two-way direct connectivity between two transport containers 110. For example, one or more constituent networks of the network 105 provide connectivity directly between the transport container 110a and the transport container 110b. In certain embodiments, the one or more constituent networks of the network 105 provide two-way indirect connectivity between two transport containers 110. For example, one or more constituent networks of the network 105 provide connectivity between the transport container 110a and the transport container 110b through the transport container 110c forming a mesh or an ad hoc network.

In certain embodiments, the one or more constituent networks of the network 105 provide two-way connectivity between the transport containers 110 using one or more same or different channels, protocols, or networks of network 105. For example, a circuit-switched cellular protocol wireless network of the network 105 provides connectivity between the transport container 110a and the transport container 110b and a POTS wireless network of the network 105 provides connectivity between the transport container 110a and the transport container 110c.

Additionally, the network context 100 may, according to certain embodiments, include an electronic device 115. In certain embodiments, the electronic device 115 includes a handset. The one or more constituent networks of the network 105 provide two-way connectivity between the electronic device 115 and the transport containers 110. In certain embodiments, the one or more constituent networks of the network 105 provide two-way direct connectivity between the electronic device 115 and a transport container 110. For example, one or more constituent networks of the network 105 provide connectivity directly between the electronic device 115 and the transport container 110a. In certain embodiments, the one or more constituent networks of the network 105 provide two-way indirect connectivity between the electronic device 115 and a transport container 110. For example, one or more constituent networks of the network 105 provides connectivity between the electronic device 115 and the transport container 110a through the transport container 110c forming a mesh or an ad hoc network. In certain embodiments, the one or more constituent networks of the network 105 provide two-way connectivity between the electronic device 115 and a transport container 110 using one or more same or different channels, protocols, or networks of network 105. For example, a 3G cellular protocol wireless network of network 105 provides connectivity between the electronic device 115 and the transport container 110a, and a ZIGBEE™ network of the network 105 provides connectivity between the electronic device 115 and the transport container 110c. In certain embodiments, mobile devices include transport containers 110 and handsets, as described herein.

Further, the network context 100 may, according to certain embodiments, include a server 125. The one or more constituent networks of the network 105 provide two-way connectivity between the server 125 and the transport containers 110. In certain embodiments, the one or more constituent networks of the network 105 provide two-way direct connectivity between the server 125 and a transport container 110. For example, one or more constituent networks of the network 105 provide connectivity directly between the server 125 and the transport container 110c. In certain embodiments, the one or more constituent networks of the network 105 provide two-way indirect connectivity between the server 125 and a transport container 110. For example, one or more constituent networks of the network 105 provides connectivity between the server 125 and the transport container 110c through the transport container 110a forming a mesh or an ad hoc network. In certain embodiments, one or more constituent networks of the network 105 provide two-way connectivity between the server 125 and a transport container 110 using one or more same or different channels, protocols, or networks of network 105. For example, a BLUETOOTH® wireless network of the network 105 provides connectivity between the server 125 and the transport container 110a, and an LTE network of the network 105 provides connectivity between server 125 and transport container 110c. In certain embodiments, server 125 back-ups information transmitted between transport containers 110 or between electronic device 115 and a transport container 110 using one or more networks of the network 105.

Figure 2:
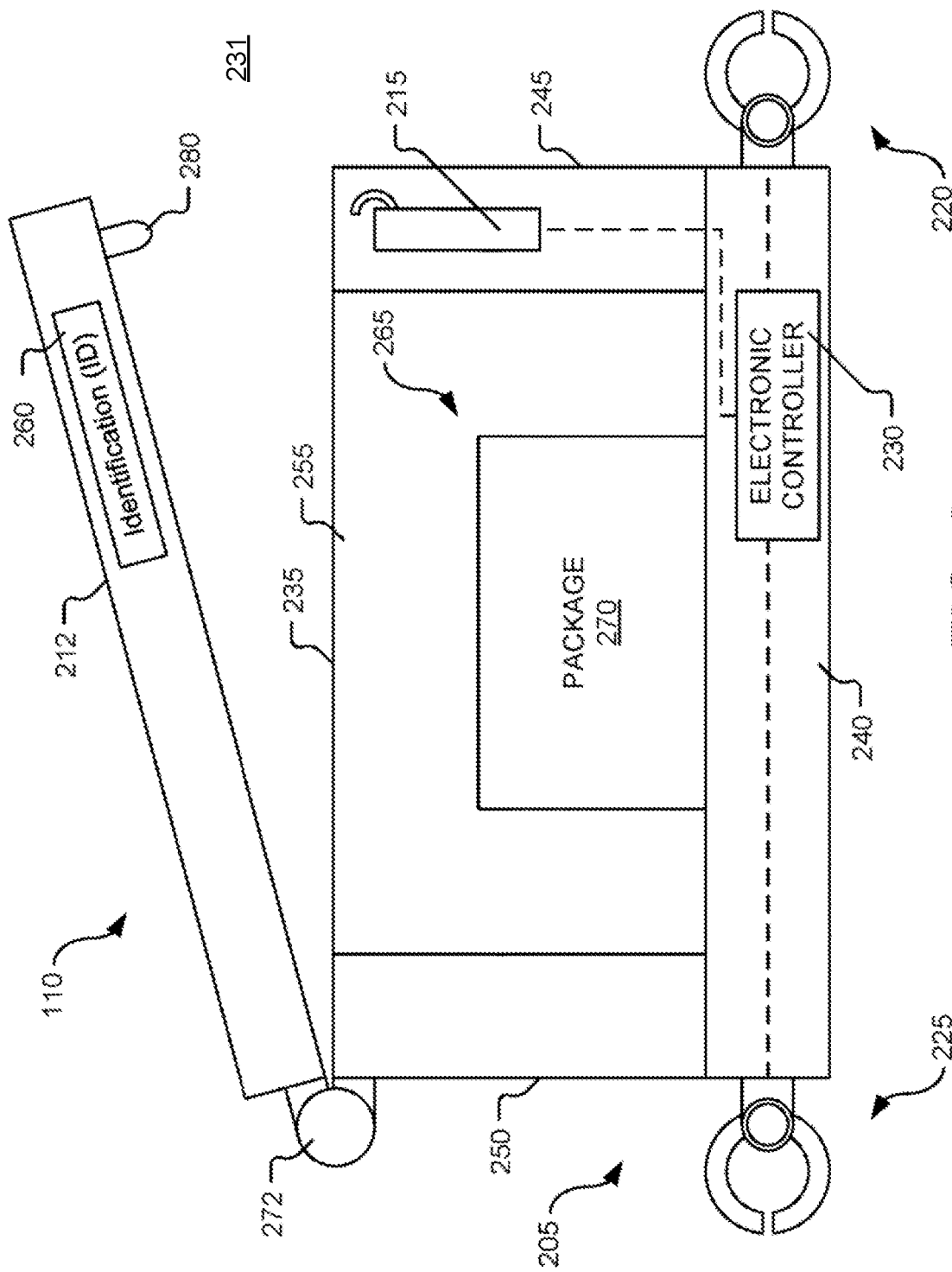
FIG. 2 is a diagram of one exemplary embodiment of a transport container according to certain embodiments of this disclosure.

FIG. 2 is a diagram of one exemplary embodiment of a transport container 110 according to certain embodiments of this disclosure. The transport container 110 illustrated in FIG. 2 includes a body 205, a cover 212, a cover lock 215, a first locking bar 220, a second locking bar 225, and an electronic controller 230. The transport container 110, as described herein, may include fewer, additional, or different components in different configurations than transport container 110 illustrated in FIG. 2. For example, in some embodiments, the transport container 110 includes only one locking bar.

The body 205 is generally box-shaped. The body 205 includes, among other things, an opening 235, a base 240, a front 245, a back 250, a first side 255, and a second side (not shown) opposite the first side 255. The opening 235, the base 240, the front 245, the back 250, the first side 255, and the second side define a cavity 265. The cavity 265 holds one or more packages or items for transport. As an illustrative example, a package 270 is placed within the cavity 265 in FIG. 2. In alternate embodiments, the body 205 has a generally cylindrical shape (not shown) defined by an opening, a base, and at least one side wall defining a cavity therebetween and coverable with a cover. Other configurations of the body 205 are also suitable so long as they define a cavity for placement of packages, parcels, and other items.

In the embodiment illustrated in FIG. 2, the cover 212 is pivotably coupled to the body 205 via one or more hinges 272. In other embodiments, the cover 212 is coupled to the body 205 via other types of connectors (for example, sliding connectors). The cover 212 pivotably coupled to the body 205 allows the cover 212 to transition between an open state and a closed state. In the open state, as illustrated in FIG. 2, the cover 212 is positioned away from the opening 235 such that the cavity 265 is exposed to an ambient environment 231 and contents within the cavity 265 are accessible from the ambient environment 231 through opening 235. In the closed state, the cover 212 is positioned adjacent and over the opening 235 to cover the opening 235 so that the cavity 265 or contents within the cavity 265 are secured and inaccessible from the ambient environment 231 through the opening 235.

The cover lock 215 is configured to transition between an unlocked state, as shown in FIG. 2, and a locked state. When the cover 212 is in the closed state and the cover lock 215 is in the locked state, the cover lock 215 engages a hook 280 included in the cover 212 to prevent the cover 212 from transitioning to the open state. Alternatively, when the cover lock 215 is in the unlocked state, the cover 212 freely moves between the closed state and the open state. The cover lock 215 is electrically coupled to the electronic controller 230. The electronic controller 230 adjusts or transitions the cover lock 215 between the locked state and the unlocked state by generating and sending control signals to the cover lock 215.

Upon being delivered to its destination, the transport container 110 is securely attached to a fixed anchor point via one or more securing mechanisms included in the transport container 110. In certain embodiments, the securing mechanism includes the first locking bar 220 and the second locking bar 225, as illustrated in FIG. 2. In certain embodiments, the fixed anchor point is a bar (not shown). The bar may be attached, for example, to a spot on the ground outside the house of the recipient of the transport container 110. The first locking bar 220 may be securely attached to the bar and thus, securely attaching the transport container 110 to the fixed anchor point. The transport container 110 remains securely attached to the fixed anchor point until the recipient of the transport container 110 retrieves the contents placed within the cavity 265 of the transport container 110. After the contents have been retrieved by the recipient, the transport container 110 can be retrieved by an authorized party (for example, a delivery person of a shipping company or an automated transport vehicle).

The transport container 110 can also be securely attached to anchor points at other locations. For example, the transport container 110 can be securely attached to an anchor point located near the location of the sender of the transport container 110. As another example, the transport container 110 can be securely attached to several different anchor points as it travels from the sender to the recipient (for example, anchors points in delivery vehicles, sorting facilities, or the like).

In some embodiments, the transport container 110 includes a single securing mechanism (e.g., the first locking bar 220). In alternate embodiments, the transport container 110 includes more than one securing mechanism (e.g., the first locking bar 220 and the second locking bar 225). In certain embodiments, the first locking bar 220 is coupled to the front 245 of the transport container 110 and the second locking bar 225 is coupled to the back 250 of the transport container 110. It should be understood that placing locking bars on opposite sides of the transport container 110 enables a secure package transfer transition from a delivery unit to either the next deliver unit or to an anchored delivery point.

The first locking bar 220, the second locking bar 225, and the anchor points, as described herein, are only one exemplary embodiment of a securing mechanism. Locking bars and anchor points can include any appropriate form of complementary locking structures (for example, clamps, hooks, levers, or the like). In addition, in some embodiments, the transport container 110 is securely attached to an anchor point via a magnet lock.

The transport containers 110 described herein are described in a same or similar manner as a counterpart transport container described in U.S. Pat. No. 9,842,449, issued Dec. 12, 2017. The content of the above-identified patent is incorporated herein by reference in its entirety.

In certain embodiments, the transport container 110 includes an identification (ID) 260. The ID 260, when electronically provided to electronic controller 230, may activate the electronic controller 230 to perform (e.g., initiate or instigate) one or more transport container labeling operations, as described herein. The ID 260 may be unique to a particular transport container 110 such that no two transport containers 110 have a same ID 260. For example, referring back to FIG. 1, each of the transport containers 110a, 110b, 110c, and 110b have a different and unique ID 260. The ID 260 may include a quick response (QR) code, a bar code, a radio-frequency identification (RFID) tag, an arrangement of one or more alpha-numeric characters, an arrangement of one or more symbols, a combination thereof, or the like.

The ID 260 may be positioned on a surface of the transport container 110. For example, the ID 260 is positioned on a surface of transport container 110 so that the ID 260 can be captured in an image or recorded and subsequently provided to the electronic controller 230. In certain embodiments, the ID 260 is positioned on an exterior surface of the transport container 110 (e.g., a surface exposed to ambient environment 231). For example, the ID 260 is positioned on a surface of the cover 212, the base 240, the front 245, the back 250, the first side 255, or the second side opposite the first side 255 that is exterior to the transport container 110 (e.g., exposed to ambient environment 231) regardless of whether the cover 212 is in the open state or the closed state. As illustrated in FIG. 2, the ID 260 is positioned on a surface of the cover 212 that is exposed to the ambient environment 231 regardless of whether the cover 212 is in the open state or the closed state.

In some embodiments, the ID 260 is positioned on an interior surface of the transport container 110 (e.g., a surface exposed to the cavity 265). In certain embodiments, the ID 260 is positioned on a surface of the transport container 110 that is exposed to the cavity 265 so that the ID 260 can be captured in an image or recorded only when the cover 212 is in the open state or when the cover lock 215 is in the unlocked state. For example, the ID 260 is positioned on a surface of the cover 212, the base 240, the front 245, the back 250, the first side 255, or the second side opposite the first side 255 that is exposed to the cavity 265 when the cover 212 is in the closed state. Only when the cover 212 is in the open state or when the cover lock 215 is in the unlocked state (e.g., enabling the cover 212 to be manually moved from the closed state to the open state) can an image of the ID 260 be captured or can the ID 260 be recorded for activating the electronic controller 230 to perform one or more transport container labeling operations, as described herein.

Additionally, or alternatively, the ID 260 is provided by the electronic controller 230 of the transport container 110. In certain embodiments, the ID 260 is displayed by the electronic controller 230 on a display screen of the transport container 110. For example, the electronic controller 230 continuously displays the ID 260 on a display screen of the transport container 110. As another example, the electronic controller 230 receives an input or a command and in response, displays the ID 260 on a display screen of the transport container 110. In certain embodiments, the ID 260 is transmitted by the electronic controller 230 to the electronic device 115 for display on a display screen of the electronic device 115. For example, the electronic controller 230 stores the ID 260 in a memory and subsequently receives an input or a command. In response to receiving the input or command, the electronic controller 230 transmits the ID 260 to the electronic device 115 for display of the ID 260 on a display screen of the electronic device 115.

As described herein, in certain embodiments, the ID 260 is displayed or transmitted for display by the electronic controller 230 in response to receiving an input or a command. Additionally, the input or command may be an encrypted signal or password generated by an electronic device 115 that is authorized or received from the server 125 by an electronic device 115 that is authorized. Thus, only an electronic device 115 that is authorized to generate or receive the encrypted signal or password may obtain the ID 260 for activating the electronic controller 230 to perform one or more transport container labeling operations, as described herein. In certain embodiments, the encrypted signal or the password is a time sensitive encrypted signal or a time sensitive password. Thus, an electronic device 115 that is authorized to generate or receive an encrypted signal or password may have until a predetermined period of time expires to obtain the ID 260 for activating the electronic controller 230 to perform one or more transport container labeling operations, as described herein.

Figure 3:
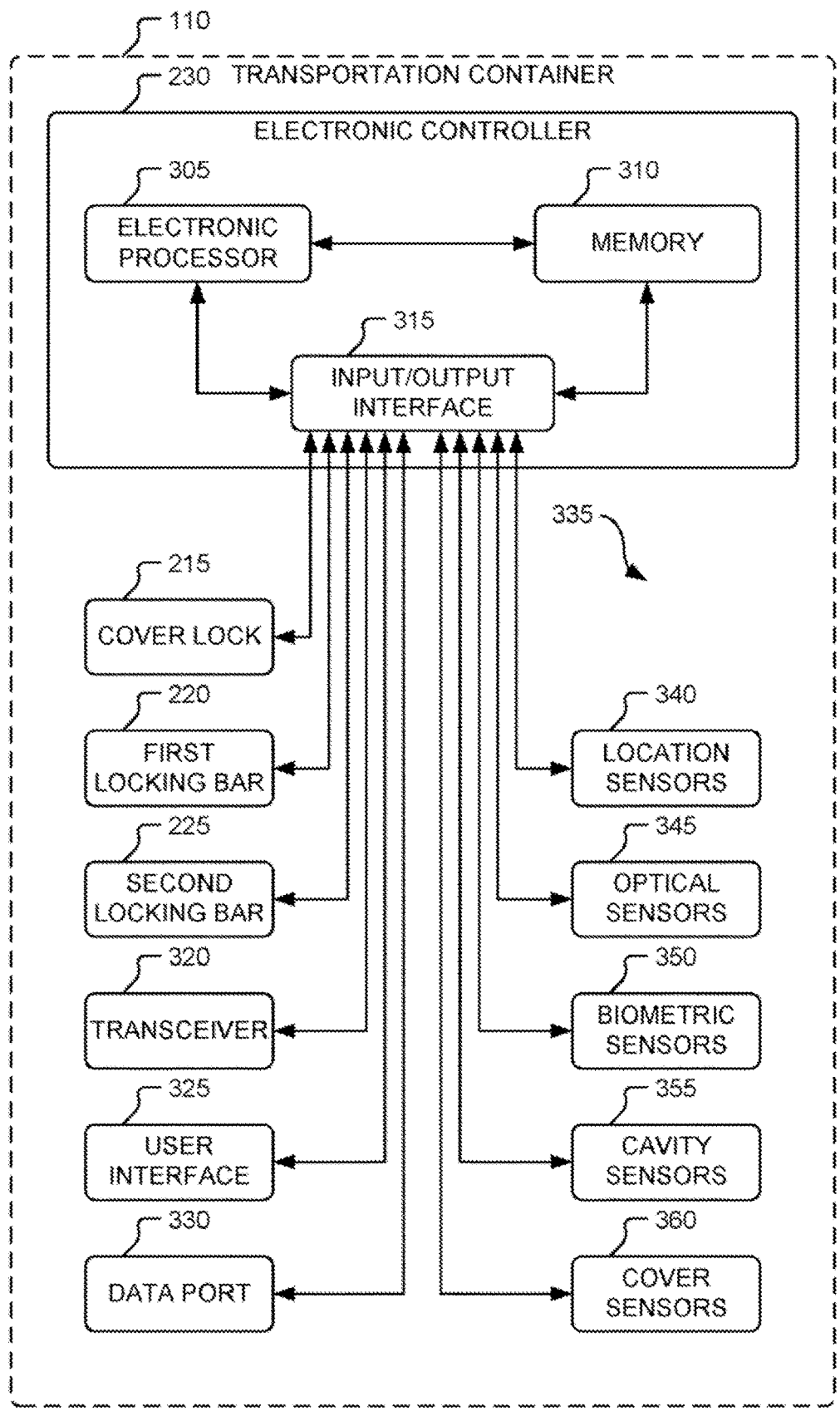
FIG. 3 is a diagram of one exemplary embodiment of the components included in transport container according to certain embodiments of this disclosure.

FIG. 3 is a diagram of one exemplary embodiment of the components included in the transport container 110 according to certain embodiments of this disclosure. In the embodiment illustrated, the transport container 110 includes the cover lock 215, the first locking bar 220, the second locking bar 225, the electronic controller 230, a transceiver 320, a user interface 325, one or more data ports 330, and a plurality of sensors 335.

The electronic controller 230 includes, among other things, an electronic processor 305 (for example, a microprocessor), a memory 310, an input/output interface 315, and a bus. The bus connects various components of the electronic controller 230 including the memory 310 to the electronic processor 305. The memory 310 includes read only memory (ROM), random access memory (RAM), an electrically erasable programmable read-only memory (EEPROM), other non-transitory computer-readable media, a combination thereof, or the like. Details concerning the memory 310 are described herein at least with respect to FIG. 4. The electronic processor 305 is configured to retrieve program instructions and data from the memory 310 and execute, among other things, instructions to perform methods described herein. Additionally or alternatively, the memory 310 is included in the electronic processor 305. The input/output interface 315 includes routines for transferring information between components within the electronic controller 230 and other components that are internal and external to the transport container 110. In certain embodiments, the electronic controller 230 includes processing circuitry for implementing one or more transport container labeling operations, as described herein.

The transceiver 320 is configured to provide communications between the transport container 110 and one or more other transport containers 110 or other components within the network context 100 (e.g., the electronic device 115, the server 125, delivery vehicles, sorting facilities, or the like). The transceiver 320 transmits signals to one or more communication networks and receives signals from the communication networks. In some embodiments, signals include, for example, data, data packets, a combination thereof, or the like. In some embodiments, the transceiver 320 includes separate transmitters and receivers. The communication network may be implemented using various networks, for example, a cellular network, the Internet, a BLUETOOTH® network, a wireless local area network (for example, Wi-Fi), a wireless accessory Personal Area Networks (PAN), cable, an Ethernet network, satellite, a machine-to-machine (M2M) autonomous network, a public switched telephone network, a combination thereof, or the like.

In certain embodiments, the transceiver 320 is configured to receive an input or a command (e.g., an encrypted signal or password) for the electronic controller 230. For example, the transceiver 320 receives an input or command from the electronic device 115 for activating the electronic controller 230 to perform one or more transport container labeling operations, as described herein. Additionally, or alternatively, the transceiver 320 is configured to transmit the ID 260 for display on a display screen of the electronic device 115. For example, the transceiver 320 transmits the ID 260 to the electronic device 115 in response to the electronic controller 230 receiving an input or command. In certain embodiments, the transceiver 320 is configured to receive the ID 260. For example, the electronic device 115 receives an image capturing the ID 260 and transmits the image capturing the ID 260 to the electronic controller 230 through the transceiver 320. In certain embodiments, the transceiver 320 is configured to receive data for storage in the memory 310. For example, the transceiver 320 receives traffic information associated with geographic routes for each delivery order, weather information associated with geographic routes for each delivery order, a plurality of maps for determining one or more geographic routes for each delivery order, transportation route information for one or more vehicles that may carry transport container 110 from the initial location to the destination location, a delivery status of one or more nearby transport containers 110, an estimate availability time of the one or more nearby transport containers 110, GPS coordinates of the one or more nearby transport containers 110 when each of the one or more nearby transport containers 110 are available, an address of the one or more nearby transport containers 110 when each of the one or more nearby transport containers 110 are available, available communication resources of each of the one or more nearby transport containers 110, and storage dimensions of the cavity 265 of each of the one or more nearby transport containers 110. In certain embodiments, the transceiver 320 is configured to receive transportation information, as described herein. For example, the electronic device 115 transmits transportation information to the electronic controller 230 through the transceiver 320 to perform one or more transport container labeling operation, as described herein.

The user interface 325 is included to control the transport container 110. The user interface 325 is operably coupled to the electronic controller 230 to control, for example, a reception of transportation information or an input or command. For example, the user interface 325 includes an optical sensor 345. The user interface 325 receives retinal data that is associated with pre-stored transportation information, as described herein. The user interface 325 receives retinal data as an input or command through the optical sensor 345 of the user interface 325. As another example, the user interface 325 includes a biometric sensor 350. The user interface 325 receives finger print data that is associated with pre-stored transportation information, as described herein. The user interface 325 receives retinal data as an input or command through the biometric sensor 350 of the user interface 325. The user interface 325 may be operably coupled to the electronic controller 230 to control, for example, a display of the ID 260. For example, in response to receiving an input or command, the electronic controller 230 generates for display the ID 260 on a display screen of the user interface 325.

In certain embodiments, the user interface 325 is operably coupled to the electronic controller 230 to control, for example, a reception of the ID 260. For example, the user interface 325 includes a key pad or a touch screen key pad to receive the ID 260. As another example, the user interface 325 includes an optical sensor 345 in the form of a camera that captures an image including the ID 260 displayed on a display screen of the electronic device 115. The user interface 325 may be operably coupled to the electronic controller 230 to receive, for example, transportation information, as described herein. For example, after the electronic controller 230 receives the ID 260, the electronic controller 230 receives transportation information through a key pad or a touch screen key pad of the user interface 325 to perform one or more transport container labeling operations, as described herein. The user interface 325 may be operably coupled to electronic controller 230 to control, for example, a display of transportation information, as described herein. For example, after the electronic controller 230 receives the ID 260 or the transportation information, the electronic controller 230 performs one or more transport container display operations including displaying the transportation information on a display screen of the user interface 325.

Additionally, or alternatively, the user interface 325 is operably coupled to the electronic controller 230 to control, for example, the states of the cover lock 215, the first locking bar 220, and the second locking bar 225. In some embodiments, the electronic controller 230 receives an unlock code from a user through the user interface 325 and changes the state of the cover lock 215, the first locking bar 220, or the second locking bar 225. For example, the electronic controller 230 changes the cover lock 215 from the locked state to the unlocked state in response to receiving an unlock code from the recipient through the user interface 325. Additionally, or alternatively, the biometric sensor 350 is a component of the user interface 325. The electronic controller 230 unlocks cover lock 215 in response to performing a biometric validation of biometric data received from the biometric sensor 350. For example, the electronic controller 230 validates a fingerprint obtained by the biometric sensor 350 of user interface 325.

The user interface 325 can include any combination of digital and analog input devices required to achieve a desired level of control for the transport container 110. For example, the user interface 325 includes a display, a camera, a speaker, a fingerprint sensor, a plurality of knobs, dials, switches, buttons, or the like. In some embodiments, the user interface 325 includes a touch-sensitive interface (e.g., a touch-screen display) that displays visual output generated by software applications executed by the electronic processor 305. Visual output includes, for example, graphical indicators, lights, colors, text, images, graphical user interfaces (GUIs), combinations of the foregoing, and the like. The touch-sensitive interface includes a suitable display mechanism for displaying the visual output (for example, a light-emitting diode (LED) screen, a liquid crystal display (LCD) screen, and the like). The touch-sensitive interface also receives user input using detected physical contact (for example, detected capacitance or resistance). Based on the user input, the touch-sensitive interface outputs signals to the electronic processor 305 which indicate positions on the touch-sensitive interface currently being selected by physical contact.

The data port 330 provides a physical connection for wired communication with the electronic controller 230. In certain embodiments, in addition to or as an alternative to using the transceiver 320, the electronic controller 230 receives and transmits data with the electronic device 115 through the data port 330 and a wired communication line. For example, using the data port 330 and a wired communication line, the electronic controller 230 receives an input or command, the ID 260, or transportation information, as described herein. As another example, using the data port 330 and a wired communication line, the electronic controller 230 transmits the ID 260, as described herein.

The plurality of sensors 335 includes various sensors configured to detect various conditions within, around, or otherwise associated with the transport container 110. In some embodiments, the sensors 335 include location sensors 340, optical sensors 345, biometric sensors 350, cavity sensors 355, or cover sensors 360. In certain embodiments, the sensors 335 additionally include movement sensors, audio sensors, electrical sensors, a combination thereof, or the like.

The location sensors 340 (for example, global positioning system (GPS) sensors) are used to determine an absolute or relative location of the transport container 110. The transport container 110 is secured to an anchoring point upon being delivered. In some embodiments, the electronic controller 230 ensures that the transport container 110 has been delivered to a correct anchoring point (e.g., an initial location or a destination location) by comparing a current location of the transport container 110 (determined using the location sensors 340) to a location of a target anchor point. In some embodiments, the location sensors 340 determine a location of the transport container 110 periodically.

Additionally, or alternatively, the location sensors 340 determine a location of the transport container 110 in response to receiving a request (e.g., through the transceiver 320). For example, a recipient or sender of the transport container 110 sends a request signal to the electronic controller 230, through the transceiver 320, requesting a location of the transport container 110. In response, the electronic controller 230 determines a current (or a last known) location of the transport container 110, through the location sensors 340, and transmits the location information to the recipient or sender, through the transceiver 320. In some embodiments, the electronic controller 230 determines the location of the transport container 110 based at least in part on one or more location signals received through the transceiver 320. In certain embodiments, the location sensors 340 guide the transport container 110 along a geographic route, as described herein. In certain embodiments, the location sensors 340 provide an indication of when the transport container 110 is at an initial location and when the transport container 110 is at a destination location, as described herein.

The optical sensors 345 (e.g., cameras and retinal scanners) are used to capture images for use by the electronic controller 230 of the transport container 110. For example, the optical sensors 345 are used to capture an image of the ID 260 for the electronic controller 230 to perform one or more transport container labeling operations, as described herein. As another example, the optical sensors 345 are used to perform a retinal scan. The electronic controller 230 validates an image produced by the retinal scan for access into the cavity 265, to receive the ID 260 through a display screen, or to associate the image produced by the retinal scan with at least some transportation information. In some embodiments, the optical sensors 345 are a component of the user interface 325. In other embodiments, the optical sensors 345 are separate components from the user interface 325.

The biometric sensors 350 (e.g., finger print scanners) are used to capture biometric data for use by the electronic controller 203 of the transport container 110. For example, the biometric sensors 350 are used to capture a finger print for validation by the electronic controller 230 to generate for display the ID 260, to associate the finger print with at least some transportation information, or to perform one or more transport container labeling operations, as described herein. In some embodiments, the biometric sensors 350 are a component of the user interface 325. In other embodiments, the biometric sensors 350 are separate components from the user interface 325.

The cavity sensors 355 (e.g., scales, electronic distance measurement devices) are sensors within the cavity 265 or positioned in the body 205 forming the cavity 265 that are used to determine whether a package is present with the cavity 265 (e.g., whether the cavity 265 is occupied or unoccupied). In certain embodiments, the cavity sensors 355 include a scale. For example, a scale provides an indication to the electronic controller 230 that weight is added to a wall forming the cavity 265 when a package is placed within the cavity 265. When no package is in the cavity 265, no weight is added to a wall of the cavity 265 and thus, the scale measures a baseline weight or no weight. The electronic controller 230 determines that no package occupies the cavity 265 (e.g., a cavity empty condition or an unoccupied state of the cavity 265) when the scale detects the baseline weight or no weight on a wall forming the cavity 265. When a package is in cavity 265, weight is added to a wall forming the cavity 265 and thus, the scale measures a weight increase from the baseline weight. The electronic controller 230 determines that a package occupies the cavity 265 (e.g., a cavity full condition or an occupied state of cavity 265) when the scale detects an increase in weight from the baseline weight on a wall forming the cavity 265.

In certain embodiments, the cavity sensors 355 include one or more electronic distance measurement devices (e.g., one or more lasers). For example, the electronic distance measurement devices provide an indication to the electronic controller 230 that an object is present within the cavity 265 when a package is placed within the cavity 265. When no package is in the cavity 265, the electronic distance measurement devices measure a base line distance across the cavity 265 (e.g., a distance that extends from one wall forming cavity 265 to another wall forming cavity 265). The electronic controller 230 determines that no package occupies the cavity 265 (e.g., a cavity empty condition or an unoccupied state of cavity 265) when the electronic distance measurement devices measure the base line distance. When a package is in the cavity 265, the electronic distance measurement devices measure a distance in the cavity 265 that is less than the base line distance (e.g., a distance between a wall forming cavity 265 and a surface of the package in cavity 265). The electronic controller 230 determines that a package occupies the cavity 265 (e.g., a cavity full condition or an occupied state of cavity 265) when the electronic distance measurement devices measure a distance within the cavity 265 that is less than the base line distance.

The cover sensors 360 (e.g., pressure sensors, proximity sensors, contact sensors, light sensors) are sensors that detect whether the cover 212 is the open state or the closed state. In certain embodiments, the cover sensors 360 include contact sensors. The contact sensors detect contact between the cover 212 and the body 205. For example, the contact sensors detect whether the cover 212 is in contact with a surface of the body 205 that forms a perimeter around the opening 235. The electronic controller 230 determines that the cover 212 is in the closed state when the contact sensors detect that the cover 212 is in contact with a surface of the body 205 that forms a perimeter around the opening 235. The electronic controller 230 determines that the cover 212 is in the open state when the contact sensors detect that the cover 212 is not in contact with a surface of the body 205 that forms a perimeter around the opening 235.

In certain embodiments, the cover sensors 360 include light sensors. The light sensors detect a presence or an absence of light. For example, the one or more light sensors are positioned on an interior surface of the body 205 that is exposed to the cavity 265, on a surface of the body 205 that forms a perimeter around the opening 235, or on a surface of the cover 212 that is exposed to the cavity 265 when the cover 212 is in the closed state. When the cover 212 is in the closed state, the light sensors detect a relatively low amount of light. The electronic controller 230 determines that the cover 212 is in the closed state when the light sensors measure the relatively low amount of light. When the cover 212 is in the open state, the light sensors detect a relatively high amount of light. The electronic controller 230 determines that the cover 212 is in the open state when the light sensors measure the relatively high amount of light.

Figure 4:
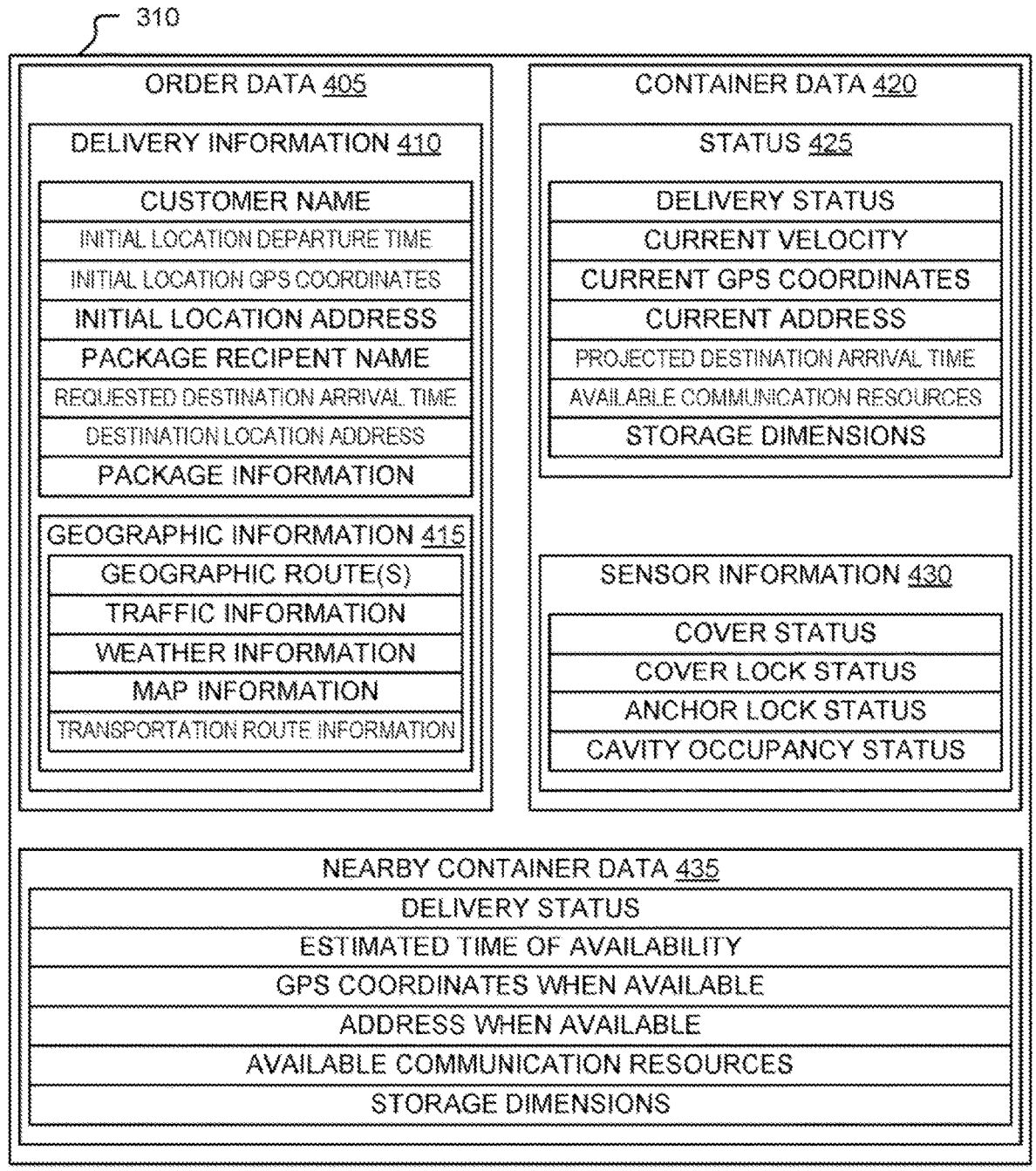
FIG. 4 illustrates data structures for storing data in memory for one or more transport container labeling operations according to certain embodiments of this disclosure.

FIG. 4 illustrates data structures for storing data in the memory 310 for one or more transport container labeling operations according to certain embodiments of this disclosure. According to certain embodiments of this disclosure, transport container labeling operations are performed by the electronic controller 230 to determine a geographic route from an initial location to a destination location, display transportation information on a display screen, and deploy the transport container 110 from the initial location along the geographic route. According to some embodiments, labeling transport containers 110 (for example, with transportation information), determining a geographic route from an initial location to a destination location, and deploying the transport container 110 from the initial location along the geographic route can be an expensive and painstaking proposition. Storing data in one or more data structures of the memory 310 enables the transport container 110 to independently determine a geographic route from an initial location to a destination or final location to operate offline, independently display a label, and independently deploy the transport container 110 from the initial location along the geographic route without having to communicate with the server 125.

FIG. 4 provides several examples of data structures 405, 410, 415, 420, and 435, which according to certain embodiments, are maintained in the memory 310 of the transport container 110 and in which values of parameters for transport container labeling operations are stored. According to certain embodiments, data structures 405, 410, 415, 420, and 435 may be lists, strings, tables, or dictionaries.

Delivery order data structure 405 includes data pertaining to one or more delivery orders received by the electronic controller 230 of the transport container 110. As shown in FIG. 4, delivery order data structure 405 includes delivery information data substructure 410 and geographic information data substructure 415. Delivery information data substructure 410 includes information related to the one or more delivery orders. For example, delivery information data substructure 410 includes customer names, initial location departure times for each delivery order, initial location GPS coordinates for each delivery order, initial location addresses for each delivery order, package recipient's name for each delivery order, requested destination arrival times for each delivery order, destination location GPS coordinates for each delivery order, destination location addresses for each delivery order, and a package type, size, dimensions, weight, and any special accommodations for each delivery order.

Geographic information data substructure 415 includes geographic and travel information related to one or more delivery orders. For example, geographic information data substructure 415 includes one or more determined geographic routes for each delivery order, traffic information associated with geographic routes for each delivery order, weather information associated with geographic routes for each delivery order, a plurality of maps for determining one or more geographic routes for each delivery order, and transportation route information for one or more vehicles that may carry transport container 110 from the initial location to the destination location.

Container data structure 420 includes data pertaining to the transport container 110. As shown in FIG. 4, container data structure 420 includes container status data substructure 425 and container sensor information data substructure 430. Container status data substructure 425 includes container delivery status information of the transport container 110. For example, delivery information data substructure 410 includes a delivery status of the transport container 110, a current travel velocity of the transport container 110, current GPS coordinates of the transport container 110, a current closest address of the transport container 110, a projected destination arrival time of the transport container 110, available communication resources of the transport container 110, and storage dimensions of the cavity 265 of the transport container 110. Container sensor information data substructure 430 includes information related to one or more sensors of the transport container 110. For example, container sensor information data substructure 430 includes a status of the cover 212, a status of the cover lock 215, a status of the locking bars 220 and 225, and an occupancy status of the cavity 265. It should be understood that information from delivery order data structure 405 and information from container data structure 420 may be displayed on a display screen as a transport container labeling operation, as described herein.

Nearby container data structure 435 includes data pertaining to one or more nearby transport containers 110. As shown in FIG. 4, nearby container data structure 435 includes a delivery status of one or more nearby transport containers 110, an estimate availability time of the one or more nearby transport containers 110, GPS coordinates of the one or more nearby transport containers 110 when each of the one or more nearby transport containers 110 are available, an address of the one or more nearby transport containers 110 when each of the one or more nearby transport containers 110 are available, available communication resources of each of the one or more nearby transport containers 110, and storage dimensions of the cavity 265 of each of the one or more nearby transport containers 110.

In certain embodiments, nearby container data stored in the nearby container data storage structure 435 is maintained for a predetermined number of other transport containers 110 that are geographically closest to the transport container 110. Thus, for example, as a first transport container 110 moves further away from the transport container 110, nearby container data for the first transport container 110 may be replaced with nearby container data for a second transport container 110 that has moved towards the transport container 110. In certain embodiments, nearby container data stored in the nearby container data storage structure 435 is maintained for a predetermined number of other transport containers 110 that communicate on one or more specified networks of the network 105 with the transport container 110. Thus, for example, as a first transport container 110 no longer communicates with the transport container 110 on the one or more specified networks, nearby container data for the first transport container 110 may be replaced with nearby container data for a second transport container 110 that recently began communicating with the transport container 110 on the one or more specified networks.

Turning back to FIG. 3, as described herein, the electronic controller 230 includes processing circuitry for performing one or more transport container labeling operations. Generally, the electronic controller 230, performing one or more transport container labeling operations, determines one or more geographic routes from an initial location to a destination location based on received transportation information, displays at least some of the transportation information on a user interface, and deploys the transport container 110 from the initial location along a geographic route of the one or more geographic routes.

The electronic controller 230 receives transportation information. Transportation information includes data related to a shipping or delivery order for transporting a package from an initial location to a final or destination location. For example, transportation information includes a customer's or a shipper's name, billing address, and payment information, a number of packages to be delivered, a size, dimensions, and weight of each package to be delivered, an initial location to pick up and begin transport of a package, a requested date and time to pick up and begin transport of a package from an initial location, a destination or final location to deposit and end transport of a package, a requested date and time for reaching a destination or final location to deposit and end transport of a package, one or more special requirements needed for transporting a package, or the like. Transportation information is used by the electronic controller 230 to implement one or more transport device labeling operations, as described herein.

In certain embodiments, the electronic controller 230 receives transportation information through the transceiver 320 from another electronic device 115 (e.g., a mobile device or a desktop computer). For example, one or more electronic controllers 230 receive transportation information through their respective transceivers 320 from a mobile device, such as a handset. A customer may need to retrieve a transport container 110 for shipping or delivering a package to a destination location. The customer enters transportation information into an interface (e.g., an electronic application interface for placing a shipping order or a shipping order placement website) displayed on the handset. Using the handset, the customer wirelessly transmits the transportation information directly to one or more transport containers 110 for reception by their respective electronic controllers 230 through their respective transceivers 320 to retrieve a transport container 110. Each of the respective transceivers 320 receives transportation information using one or more wireless networks, protocols, or channels, as described herein.

As another example, one or more electronic controllers 230 receive transportation information through their respective transceivers 320 from a mobile device, such as another transport container 110. A customer may need to retrieve a transport container 110 for shipping or delivering a package to a destination. The customer enters transportation information into an interface displayed on the handset. Using the handset, the customer wirelessly transmits the transportation information directly to one or more transport containers 110 for reception by their respective electronic controllers 230 through their respective transceivers 320. In response to receiving the transportation information, the transport container 110 transmits the transportation information to one or more other transport containers 110 for reception by their respective electronic controllers 230 through their respective transceivers 320. Direct communication between two or more transport container 110 or indirect communication between an electronic device 115 (e.g., a handset) and a first electronic controller 230 of a first transport container 110 through a second electronic controller 230 of a second transport container 110 forms a mesh network or an ad hoc network that permits individual transport containers 110 to communicate directly with each other (e.g., without requiring a central server).

As yet another example, one or more electronic controllers 230 receive transportation information through their respective transceivers 320 from a desktop computer. A customer may need to retrieve a transport container 110 for shipping or delivering a package to a destination. The customer enters transportation information into an interface displayed on the desktop computer. Using the desktop computer, the customer transmits, through a combination of wireless and wired connections, the transportation information directly to one or more transport containers 110 for reception by their respective electronic controllers 230 through their respective transceivers 320 to retrieve a transport container 110.

In certain embodiments, an electronic controller 230 receives transportation information through a user interface 325 or through a data port 330 and wired connection. For example, a customer is in possession of a transport container 110 that contains one or more packages for shipment in the cavity 265. The customer may anticipate making another shipment in the near future or may have additional packages that do not fit in the cavity 265 of the transport container 110 currently in the customer's possession. The customer enters transportation information directly into the user interface 325 of the transport container 110 in the customer's possession. Additionally, or alternatively, the customer enters transportation information into an electronic device 115 (e.g., a handset, desktop computer) that transmits the transportation information to the electronic controller 230 through the data port 330 and a wired connection. The transport container 110 transmits, through the transceiver 320, the received transportation information to one or more other transport containers 110 for retrieval of another transport container 110 by the customer.

The electronic controller 230 determines a geographic route from an initial location to a destination location based on received transportation information. In certain embodiments, when a transport container 110 receives transportation information and the electronic controller 230 has independently determined that the transport container 110 is available to transport a package, the electronic controller 230 may use the data received from the transportation information and determine one or more geographic routes from an initial location to a destination location. For example, the electronic controller 230 uses the data received from the transportation information including an initial location to pick up and begin transport of the package and the destination location to deposit the package and end delivery of the package and accesses data stored in the memory 310 to identify the transport container's current location, map information that includes the transport container's current location, the initial location to pick up and begin transport of the package, and the destination location to deposit the package and end delivery of the package. In some embodiments, the electronic controller 230 may also access data stored in the memory 310 that includes traffic information, weather information, and transportation route information of one or more vehicles that carry transport containers between locations. Using the received transportation information and the information stored in the memory 310, the electronic controller 230 determines one or more geographic routes from an initial location (e.g., the current location of the transport container 110, a future location of the transport container 110, or the location where the transport container 110 picks up the package for transport) to the destination location.

In certain embodiments, the geographic route includes one or more streets, highways, river routes, lake routes, ocean routes, airway routes, a combination there of, or the like. For example, the geographic route includes movement by van using one or more streets or highways, movement by boat across an ocean, and movement by airplane over a mountain range. In certain embodiments, the geographic route includes one or more specific transport vehicles or one or more transport carriers. For example, the geographic route includes initially using a specific local transport vehicle to reach a distribution hub and a particular time, a specific long range transport vehicle to reach a distribution hub in another city before inclement weather reaches the other city, and finally another specific local transport vehicle to reach the destination location in a timely manner.

The electronic controller 230 displays or generates for display at least some transportation information on a display screen. In certain embodiments, when a transport container 110 receives transportation information and the electronic controller 230 has independently determined that the transport container 110 is available to transport a package, the electronic controller 230 displays at least some transportation information on a display screen of the user interface 325 or transmits at least some transportation information for display on a display screen of an electronic device 115. The displayed transportation information may include the customer's name, an initial location departure time for the delivery order, initial location GPS coordinates for the delivery order, an initial location address for the delivery order, a package recipient's name for the delivery order, a requested destination arrival time for the delivery order, destination location GPS coordinates for the delivery order, a destination location address for the delivery order, a package type, size, dimensions, weight, any special accommodations for the delivery order, one or more determined geographic routes for the delivery order, traffic information associated with the geographic routes for the delivery order, weather information associated with the geographic routes for the delivery order, or transportation route information for one or more vehicles that may carry the transport container 110 from the initial location to the destination location.

In certain embodiments, the electronic controller 230 displays the transportation information through the duration of the transport from the initial location to the destination location. In other embodiments, the electronic controller 230 displays the transportation information for an initial duration of time and when a display of the transportation information is subsequently requested. The electronic controller 230 displays or generates for display at least some of the transportation information so that a customer can immediately verify that the transportation information is correct and so that a worker involved in transporting the transport container 110 can instantly receive information about the shipping order.

The electronic controller 230 deploys the transport container 110 from the initial location along the path of the geographic route. In certain embodiments, when a transport container 110 receives transportation information and the electronic controller 230 has determined the geographic route from the initial location to the destination location, the electronic controller 230 deploys the transport container 110 from the initial location along the geographic route. For example, the electronic controller 230 deploys the transport container 110 from the initial location along the geographic route by transmitting a signal to a particular transport vehicle or a particular transport carrier to pick-up the transport container 110 to begin movement of the transport container 110 along the geographic route. As another example, the transport container 110 is electronically and physically coupled to a transport vehicle. The electronic controller 230 deploys the transport container 110 from the initial location along the geographic route by commanding the transport vehicle to begin moving along the geographic route.

In certain embodiments, the initial location is the current location of the transport container 110. For example, the customer may be in possession of the transport container 110 when the transport container 110 receives transportation information. The electronic controller 230 of the transport container 110 determines that the transport container's current location is the initial location and deploys the transport container 110 from the initial position along the path of the geographic route. In certain embodiments, the initial location is the location where the transport container 110 receives a package for transport. For example, the customer may need a transport container 110 for transporting a package at a later time. The electronic controller 230 receives the transportation information, identifies that the initial location is not the current location of the transport container 110, and deploys the transport container 110 for the initial location. In certain embodiments, the initial location may be a future location of the transport container 110. For example, the electronic controller 230 may receive transportation information including a location where the transport container 110 is to pick up a package for transport. The electronic controller 230 is also aware that the transport container 110 is finishing a current transport and will soon be available to make the requested transport. The electronic controller 230 determines the location that the transport container 110 will be at the end of its current transport and identifies that location as the initial location for the requested transport. In at least this embodiment, the location where the transport container 110 receives the package for transport is another location that is including along the geographic route or is the destination location.

In certain embodiments, when retrieving a transport container 110 for shipping or delivering a package, at least some transportation information is stored with an account (e.g., a customer's account on a server 125 or in an electronic device 115) so that less transportation information needs to be entered to complete a single shipping order. For example, a customer uses an electronic device to access an interface to create a customer account to place multiple shipping or delivery orders. The customer provides at least some transportation information through the electronic device 115 for storage and subsequent use for initiating shipping orders using the account. The transportation information stored for subsequent use includes one or more of a customer's or a shipper's name, billing address, and payment information, one or more reoccurring initial locations to pick-up and begin transport of a package, one or more reoccurring destination or final locations to deposit and end transport of a package, one or more reoccurring special requirements needed for transporting a package, or the like. Thus, when the customer uses an electronic device 115 to access an interface for initiating a shipping order through their account, the customer does not have to manually enter at least some transportation information to complete the shipping order. As another example, a customer may have an electronic account storing at least some transportation information for reoccurring use. The transportation information includes a shipper's name and an address of the initial or a GPS location of the initial location. The transport container 110 receives both the shipper's name and the initial location and in response the electronic controller 230 deploys the transport container 110 from its current location to the initial location to pick-up the package and begin a shipment of the package to the destination location. Once the transport container 110 is received by the customer at the initial location, remaining transport information is provided to the electronic controller 230 to perform one or more transport container labeling operations.

In certain embodiments, at least some of the transportation information is linked with a biometric parameter. For example, transportation information stored with an account is linked with a finger print of the customer or an eye configuration of the customer. Thus, the customer can provide his finger print through a biometric sensor 350 on the transport container 110 or have his eye scanned through an optical sensor 345 on the transport container to transmit at least some of the transportation information to the electronic controller 230.

In certain embodiments, the electronic controller 230 performs one or more transport container labeling operations when the electronic controller 230 receives the ID 260. For example, the transport container 110 displays the ID 260 on a surface of the transport container 110. The ID 260 may be captured in an image and presented to an optical sensor 345 on the user interface 325 for reception by the electronic controller 230. When the electronic controller 230 has received the ID 260, the electronic controller 230 performs one or more transport container labeling operations. As another example, the transport container 110 displays the ID 260 on the user interface 325, the ID 260 may be recorded by an electronic device 115 and transmitted to the electronic controller 230 through the transceiver 320. When the electronic controller 230 has received the ID 260, the electronic controller 230 performs one or more transport container labeling operations.

In some embodiments, the electronic controller 230 is configured to receive transportation information through the user interface 325 when the electronic controller 230 has received the ID 260. For example, the electronic controller 230 is configured to receive transportation information through the transceiver 320 or from a mobile device as an electronic controller default. When the electronic controller 230 receives the ID 260, the electronic controller 230 activates the user interface 325 as an option to provide transportation information to the electronic controller 230. This feature may prevent unauthorized users from tampering with the transport container 110 when a customer is retrieving the transport container 110.

In certain embodiments, the electronic controller 230 performs one or more transport container labeling operation when the electronic controller 230 determines that the transport container 110 is available for transport. When a transport container 110 receives transportation information, the electronic controller 230 may independently determine the transport container's own availability to transport a package and the transport container's own relative availability to transport a package compared to other transport containers 110. For example, in response to receiving transportation information, a transport container 110, using the electronic controller 230, independently determines the transport container's own availability to transport a package. The electronic controller 230, using one or more cavity sensors 355, determines whether its cavity 265 contains a package. If the electronic controller 230 determines that the transport container's cavity 265 does contain a package (e.g., the cavity 265 of the transport container 110 is occupied or is in an occupied state), the electronic controller 230 determines that the transport container 110 is currently unavailable for transporting a package. When the electronic controller 230 determines that the transport container 110 is currently unavailable for transporting a package, the electronic controller 230 may ignore the transportation information, transmit the transportation information to another transport container 110, or independently determine the transport container's own relative availability to transport the package compared to one or more other transport containers 110.

When the electronic controller 230 determines that the transport container's cavity 265 does not contain a package (e.g., the cavity 265 of the transport container 110 is unoccupied or is in an unoccupied state), the electronic controller 230 may determine that the transport container 110 is available or whether the transport container 110 is scheduled to transport another package (e.g., the cavity 265 of the transport container 110 is schedule to be occupied) based on order data stored in the memory 310. When the electronic controller 230 determines that the transport container 110 is scheduled to transport another package, the electronic controller 230 may ignore the transportation information, transmit the transportation information to another transport container 110, or independently determine the transport container's relative availability to transport the package compared to one or more other transport containers 110.

When the electronic controller 230 determines that the transport container 110 is not scheduled to transport another package, the electronic controller 230 may determine that the transport container 110 is available for transporting the package. When the electronic controller 230 determines that the transport container 110 is available for transporting a package, the electronic controller 230 may perform one or more transport container labeling operations, as described herein, or independently determine the transport container's relative availability to transport the package compared to one or more other transport containers 110. Additionally or alternatively, when the electronic controller 230 determines that the transport container 110 is available for transporting a package, the electronic controller 230 may transmit a signal indicating that the transport container 110 is scheduled or en route to retrieve the customer's package for transport. In certain embodiments, when the electronic controller 230 determines that the transport container 110 is available to transport a package, the electronic controller 230 stores the transportation information in the memory 310 as delivery order data.

As another example, in response to receiving transportation information, the transport container 110, using electronic controller 230, independently determines the transport container's own relative availability to transport a package compared to one or more other transport containers 110. A transport container 110 periodically receives transport container data from each of one or more transport containers 110 nearby or within a vicinity of the transport container 110 and stores the transport container data in the memory 310. Transport container data includes one or more of a delivery status (e.g., in the process of transporting, scheduled to transport, or available to transport), an estimated time of availability, GPS coordinates or an address when available, an indication of available communication resources, storage dimensions, or the like. The electronic controller 230 compares the received and stored transport container data with the transport container's own order data (e.g., of one or more shipping orders) and independently determines whether the transport container's is the most available to transport a package compared to the other transport containers 110.

When the electronic controller 230 determines that the transport container 110 is the most available transport container 110 to transport a package, the electronic controller 230 performs one or more transport container labeling operations, as described herein. Additionally or alternatively, when the electronic controller 230 determines that the transport container 110 is the most available transport container 110 to transport a package, the electronic controller 230 may transmit a signal indicating that the transport container 110 is scheduled or en route to retrieve the customer's package for transport. In certain embodiments, when the electronic controller 230 determines that the transport container 110 is the most available transport container 110 to transport a package, the electronic controller 230 stores the transportation information in the memory 310 as delivery order data. When the electronic controller 230 determines that the transport container 110 is not the most available transport container 110 to transport a package, the electronic controller 230 may ignore the transportation information or transmit the transportation information to another transport container 110.

In certain embodiments, the electronic controller 230 performs one or more transport container labeling operations when the electronic controller 230 determines that the cover 212 is in the open state, that the cover lock 215 is in the unlocked state, or that one or more locking bars are in the locked state. For example, when the electronic controller 230 determines that the cover lock 215 is in the unlocked state or that the cover 212 is in the open state, the electronic controller 230 can perform one or more transport container labeling operations, as described herein. Conversely, when the electronic controller 230 determines that the cover lock 215 is in the locked state and that the cover 212 is in the closed state, the electronic controller 230 is unable to perform one or more transport container labeling operations. This feature allows only those with authorization to access the contents within the cavity 265 to label and deploy the transportation container 110 from an initial destination along a determined geographic route.

As another example, when the electronic controller 230 determines that either of the locking bars 220 and 225 is in the locked state, the electronic controller 230 can perform one or more transport container labeling operations as described herein. Conversely, when the electronic controller 230 determines that both locking bars 220 and 225 are in the unlocked state, the electronic controller 230 is unable to perform one or more transport container labeling operations. This feature prevents unauthorized individual from relabeling and redeploying the transportation container 110 to another location while the transport container is moving from the initial destination along the geographic route.

Figure 5:
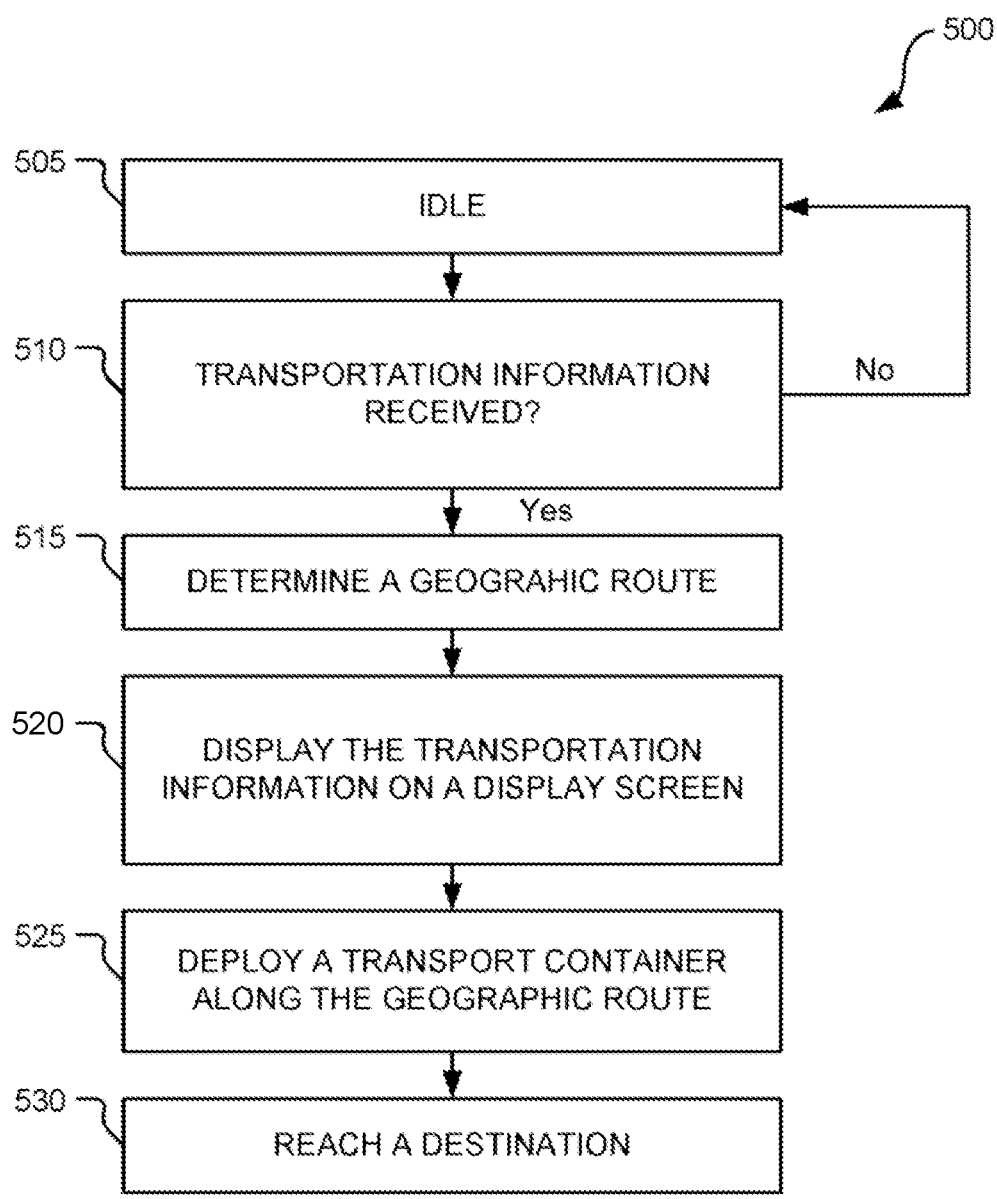
FIG. 5 illustrates a method implemented by an electronic controller of a transport container for performing transport container labeling operations according to certain embodiments of this disclosure.

FIG. 5 illustrates a method 500 implemented by an electronic controller 230 of a transport container 110 for performing transport container labeling operations according to certain embodiments of this disclosure. Although certain details will be provided with reference to the method 500 of FIG. 5, it should be understood that other embodiments may include more, less, or different method steps. At step 505, the electronic controller 230 of the transport container 110 is in an idle state at least with respect to performing transport container labeling operations. At step 510, the electronic controller 230 determines whether transportation information has been received. If transportation information has not been received, then the electronic controller 230 returns to idle at step 505. If transportation information has been received, then the electronic controller 230 proceeds to step 515. As discussed herein, transportation information includes a customer's or a shipper's name, billing address, and payment information, a number of packages to be delivered, a size, dimensions, and weight of each package to be delivered, an initial location to pick up and begin transport of a package, a requested date and time to pick up and begin transport of a package from an initial location, a destination or final location to deposit and end transport of a package, a requested date and time for reaching a destination or final location to deposit and end transport of a package, one or more special requirements needed for transporting a package, or the like.

At step 515, the electronic controller 230 determines a geographic route from an initial location to a destination location based on the received transportation information. For example, the electronic controller 230 uses the data received from the transportation information including an initial location to pick up and begin transport of the package and the destination location to deposit the package and end delivery of the package and accesses data stored in the memory 310 to identify the transport container's current location, map information that includes the transport container's current location, the initial location to pick up and begin transport of the package, and the destination location to deposit the package and end delivery of the package. In some embodiments, the electronic controller 230 may also access data stored in the memory 310 that includes traffic information, weather information, transportation route information of one or more vehicles that carry transport containers between locations, or the like. Using the received transportation information and the information stored in the memory 310, the electronic controller 230 determines one or more geographic routes from an initial location (e.g., the current location of the transport container 110, a future location of the transport container 110, or the location where the transport container 110 picks up the package for transport) to the destination location.

At step 520, the electronic controller 230 displays or generates and transmits for display at least some of the received transportation information on a display screen. The displayed transportation information may include the customer's name, an initial location departure time for the delivery order, initial location GPS coordinates for the delivery order, an initial location address for the delivery order, a package recipient's name for the delivery order, a requested destination arrival time for the delivery order, destination location GPS coordinates for the delivery order, a destination location address for the delivery order, a package type, size, dimensions, weight, any special accommodations for the delivery order, one or more determined geographic routes for the delivery order, traffic information associated with the geographic routes for the delivery order, weather information associated with the geographic routes for the delivery order, or transportation route information for one or more vehicles that may carry the transport container 110 from the initial location to the destination location.

At step 525, the electronic controller 230 deploys the transport container 110 from the initial location along the geographic route. For example, the electronic controller 230 deploys the transport container 110 from the initial location along the geographic route by transmitting a signal to a particular transport vehicle or a particular transport carrier to pick-up the transport container 110 to begin movement of the transport container 110 along the geographic route. As another example, the transport container 110 is electronically and physically coupled to a transport vehicle. The electronic controller 230 deploys the transport container 110 from the initial location along the geographic route by commanding the transport vehicle to begin moving along the geographic route.

At step 530, the electronic controller 230 guides the transport container 110 along the geographic route until the transport container 110 reaches its destination location. When the transport container 110 reaches its destination location, the transport container 110 may lock one or more locking bars (e.g., locking bars 220 and 225) and engage the transport container 110 with one or more anchor points. Additionally, or alternatively, when the transport container 110 reaches its destination location, the transport container 110 may unlock the cover lock 215 and transition the cover 212 from the closed state to the open state so that a package can be retrieved from the cavity 265.

Figure 6:
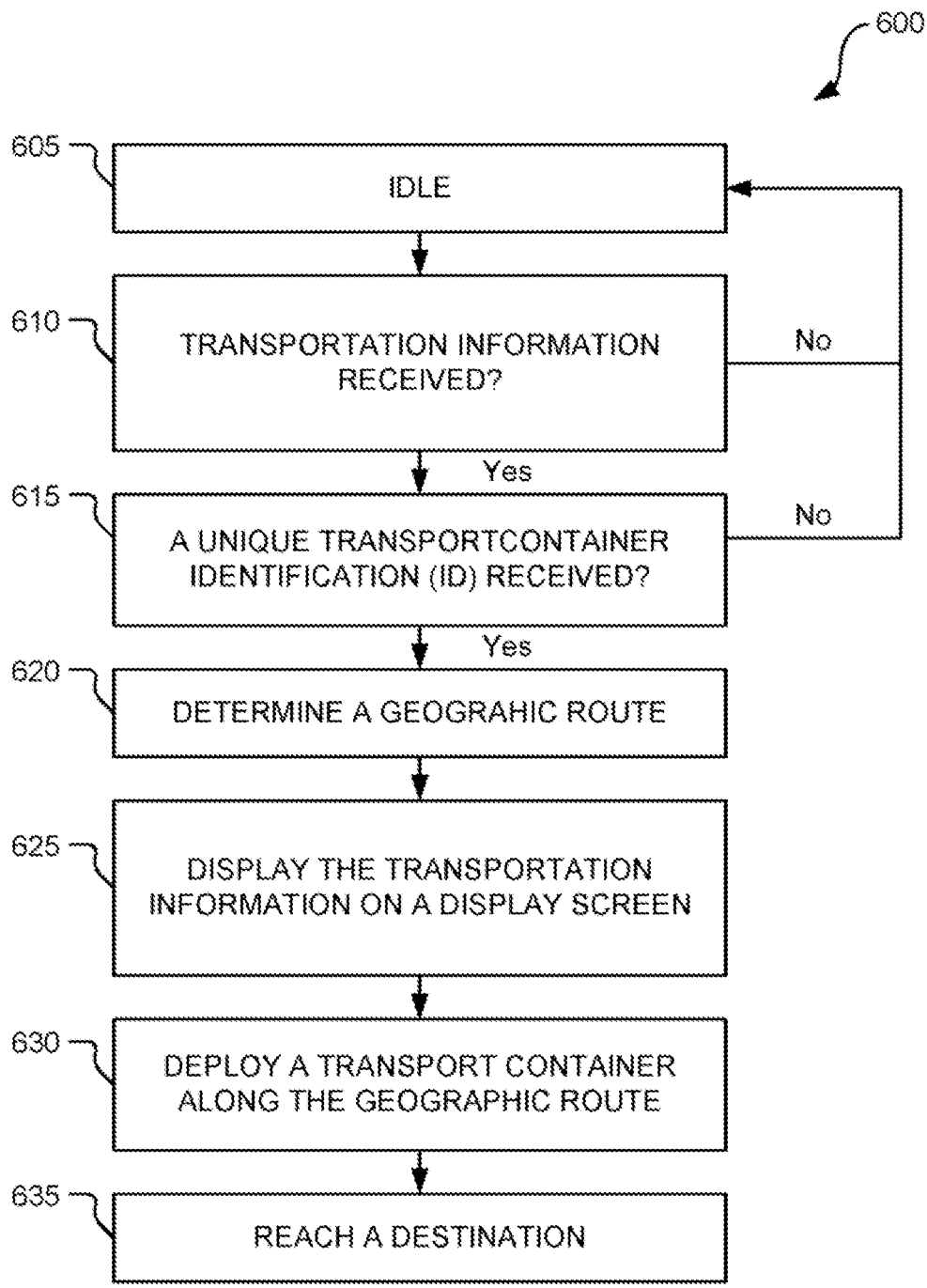
FIG. 6 illustrates another method implemented by an electronic controller of a transport container for performing transport container labeling operations according to certain embodiments of this disclosure.

FIG. 6 illustrates a method 600 implemented by an electronic controller 230 of a transport container 110 for performing transport container labeling operations according to certain embodiments of this disclosure. Although certain details will be provided with reference to the method 600 of FIG. 6, it should be understood that other embodiments may include more, less, or different method steps. At step 605, the electronic controller 230 of the transport container 110 is in an idle state at least with respect to performing transport container labeling operations. Step 605 is at least similar to step 505 of method 500 illustrated in FIG. 5. At step 610, the electronic controller 230 determines whether transportation information has been received. Step 610 is at least similar to step 510 of method 500 illustrated in FIG. 5.

At step 615, the electronic controller 230 determines whether an ID 260 has been received by the electronic controller 230. If the ID 260 has not been received, then the electronic controller 230 returns to idle at step 605. If the ID 260 has been received, then the electronic controller 230 proceeds to step 620. As an example, the transport container 110 displays the ID 260 on a surface of the transport container 110. The ID 260 may be captured in an image and presented to an optical sensor 345 on the user interface 325 for reception by the electronic controller 230. As another example, the transport container 110 displays the ID 260 on the user interface 325, the ID 260 may be recorded by an electronic device 115 and transmitted to the electronic controller 230 through the transceiver 320. When the electronic controller 230 has received the ID 260, the electronic controller 230 performs one or more transport container labeling operations.

At step 620, the electronic controller 230 determines a geographic route for an initial location to a destination location based on the received transportation information. Step 620 is at least similar to step 515 of method 500 illustrated in FIG. 5. At step 625, the electronic controller 230 displays or generates and transmits for display at least some of the received transportation information on a display screen. Step 625 is at least similar to step 520 of method 500 illustrated in FIG. 5. At step 630, the electronic controller 230 deploys the transport container 110 from the initial location along the geographic route. Step 630 is at least similar to step 525 of method 500 illustrated in FIG. 5. At step 635, the electronic controller 230 guides the transport container 110 along the geographic route until the transport container 110 reaches its destination location. Step 635 is at least similar to step 530 of method 500 illustrated in FIG. 5.

Figure 7:
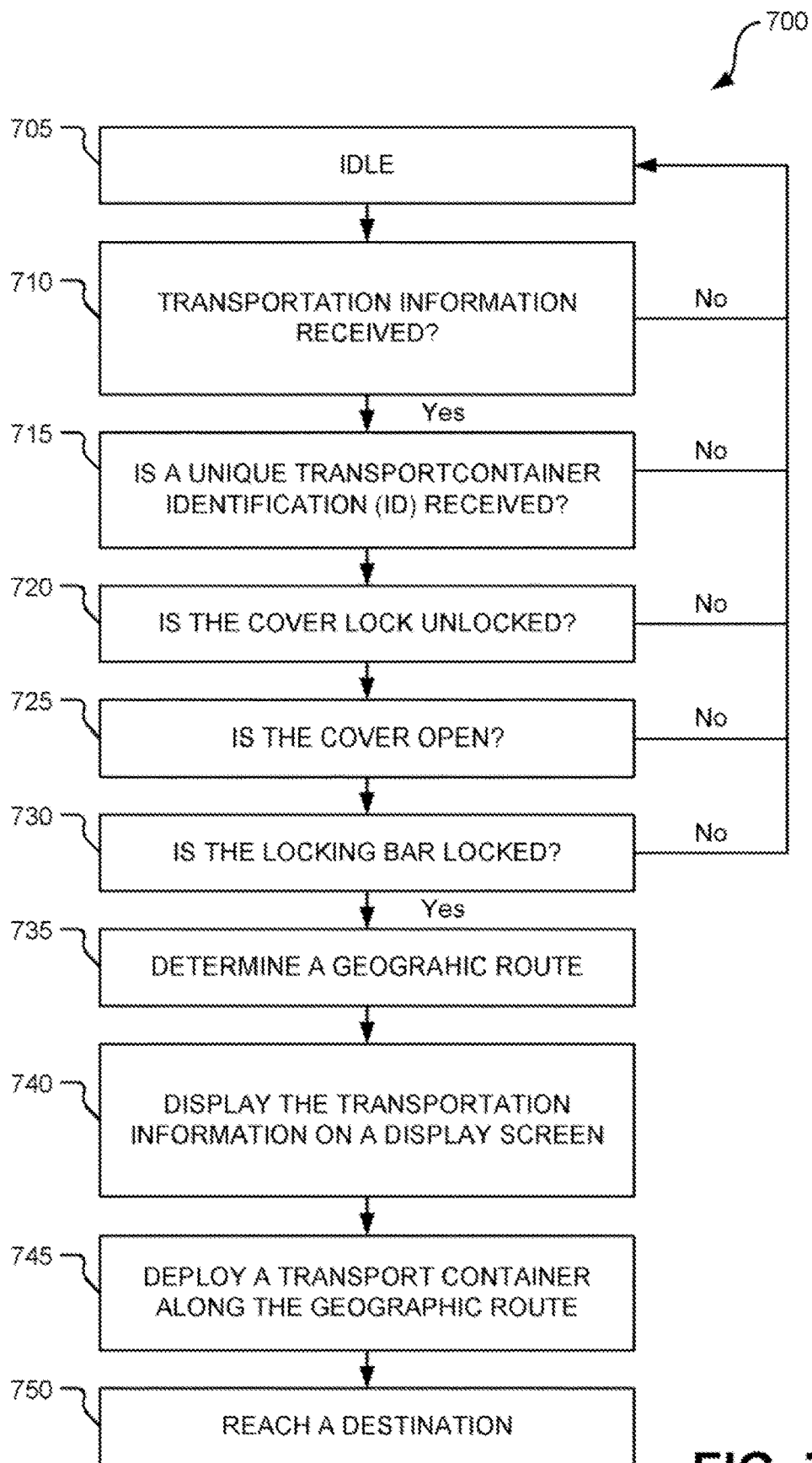
FIG. 7 illustrates another method implemented by an electronic controller of a transport container for performing transport container labeling operations according to certain embodiments of this disclosure.

FIG. 7 illustrates a method 700 implemented by an electronic controller 230 of a transport container 110 for performing transport container labeling operations according to certain embodiments of this disclosure. Although certain details will be provided with reference to the method 700 of FIG. 7, it should be understood that other embodiments may include more, less, or different method steps. At step 705, the electronic controller 230 of the transport container 110 is in an idle state at least with respect to performing transport container labeling operations. Step 705 is at least similar to step 505 of method 500 illustrated in FIG. 5. At step 710, the electronic controller 230 determines whether transportation information has been received. Step 710 is at least similar to step 510 of method 500 illustrated in FIG. 5. At step 715, the electronic controller determines whether an ID 260 has been received by the electronic controller 230. Step 715 is at least similar to step 615 of method 600 illustrated in FIG. 6.

At step 720, the electronic controller 230 determines whether the cover lock 215 is unlocked. If the electronic controller 230 determines that the cover lock 215 is not unlocked, then the electronic controller 230 returns to idle at step 705. If the electronic controller 230 determines that the cover lock 215 is unlocked, then the electronic controller 230 proceeds to step 725. At step 725, the electronic controller 230 determines whether the cover 212 is in the open state. If the electronic controller 230 determines that the cover 212 is not in the open state, then the electronic controller 230 returns to idle at step 705. If the electronic controller 230 determines that the cover 212 is in the open state, then the electronic controller 230 proceeds to step 730.

In certain embodiments, determining whether the cover lock 215 is in the unlocked state or whether the cover is in the open state allows only those with authorization to access the contents within the cavity 265 to label and deploy the transportation container 110 from an initial destination along a determined geographic route. For example, when the electronic controller 230 determines that the cover lock 215 is in the unlocked state or that the cover 212 is in the open state, the electronic controller 230 can perform one or more transport container labeling operations as described herein. Conversely, when the electronic controller 230 determines that the cover lock 215 is in the locked state and that the cover 212 is in the closed state, the electronic controller 230 is unable to perform one or more transport container labeling operations.

At step 730, the electronic controller 230 determines whether one or more locking bars (e.g., the first locking bar 220 or the second locking bar 225) is locked. If the electronic controller 230 determines that every locking bar is unlocked, then the electronic controller 230 returns to idle at step 705. If the electronic controller 230 determines that at least one locking bar is locked, then the electronic controller 230 proceeds to step 730.

In certain embodiments, determining whether at least one locking bar is locked state prevents unauthorized individual from relabeling and redeploying the transportation container 110 to another location while the transport container is moving from the initial destination along the geographic route. For example, when the electronic controller 230 determines that either of the locking bars 220 and 225 is in the locked state, the electronic controller 230 can perform one or more transport container labeling operations as described herein. Conversely, when the electronic controller 230 determines that both locking bars 220 and 225 are in the unlocked state, the electronic controller 230 is unable to perform one or more transport container labeling operations.

At step 735, the electronic controller 230 determines a geographic route for an initial location to a destination location based on the received transportation information. Step 735 is at least similar to step 515 of method 500 illustrated in FIG. 5. At step 740, the electronic controller 230 displays or generates and transmits for display at least some of the received transportation information on a display screen. Step 740 is at least similar to step 520 of method 500 illustrated in FIG. 5. At step 745, the electronic controller 230 deploys the transport container 110 from the initial location along the geographic route. Step 745 is at least similar to step 525 of method 500 illustrated in FIG. 5. At step 750, the electronic controller 230 guides the transport container 110 along the geographic route until the transport container 110 reaches its destination location. Step 750 is at least similar to step 530 of method 500 illustrated in FIG. 5.

Figure 8:
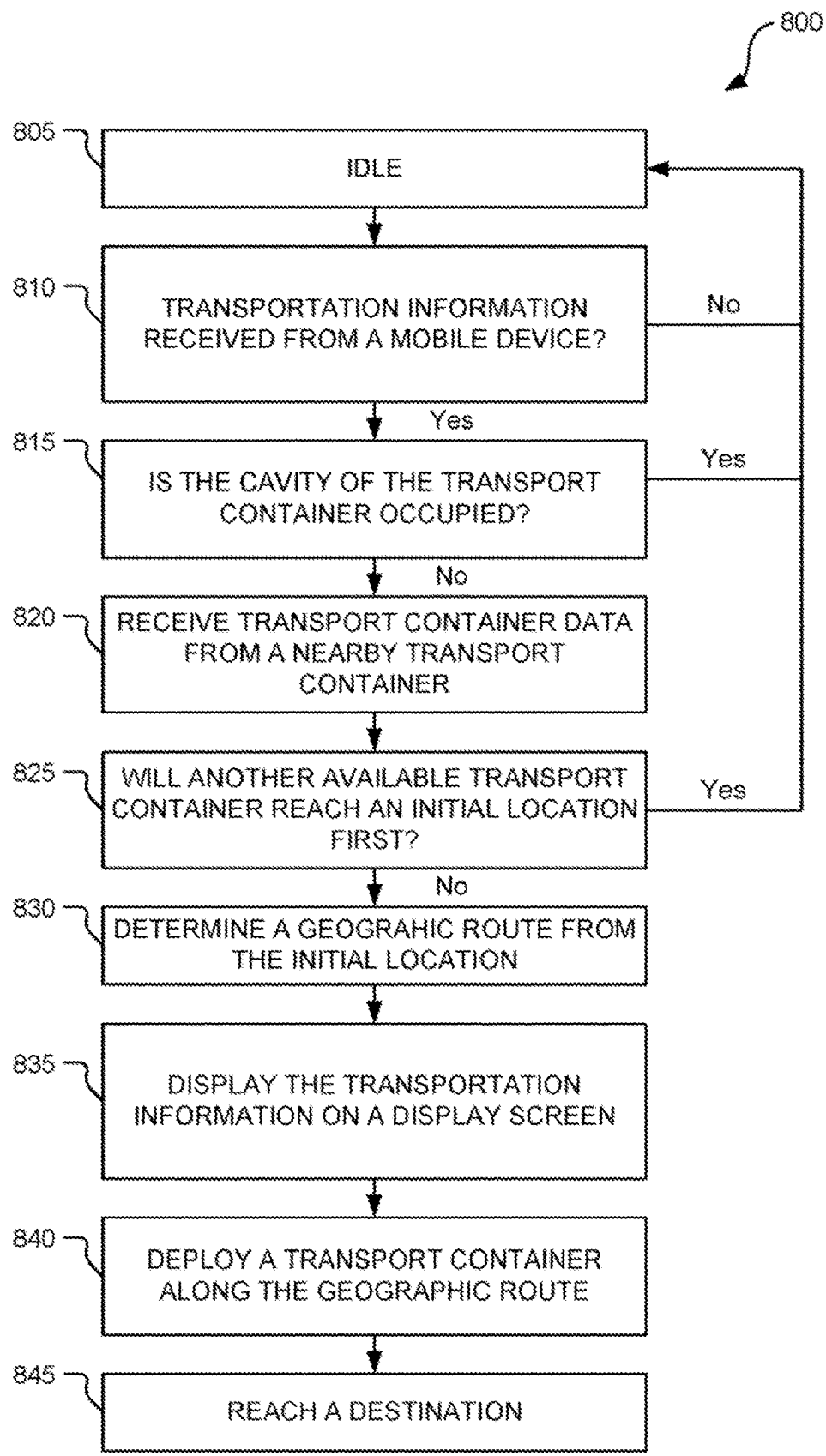
FIG. 8 illustrates another method implemented by an electronic controller of a transport container for performing transport container labeling operations according to certain embodiments of this disclosure.

FIG. 8 illustrates a method 800 implemented by an electronic controller 230 of a transport container 110 for performing transport container labeling operations according to certain embodiments of this disclosure. In certain embodiments, method 800 is implemented by an electronic controller 230 for transport container retrieval before a package is placed in the cavity 265 for transport. Although certain details will be provided with reference to the method 800 of FIG. 8, it should be understood that other embodiments may include more, less, or different method steps. At step 805, the electronic controller 230 of the transport container 110 is in an idle state at least with respect to performing transport container labeling operations. Step 805 is at least similar to step 505 of method 500 illustrated in FIG. 5.

At step 810, the electronic controller 230 determines whether transportation information has been received from a mobile device. A mobile device may include a handset or another transport container 110. If the electronic controller 230 determines that transportation information is not received from a mobile device, then the electronic controller 230 returns to idle at step 805. If the electronic controller 230 determines that transportation information is received from a mobile device, then the electronic controller 230 proceeds to step 815.

In certain embodiments, determining whether the electronic controller 230 has received transport information from a mobile device prevents unauthorized users from tampering with the transport container 110 when a customer is retrieving the transport container 110 but is not in proximity or able to view the transport container 110. For example, the electronic controller 230 is configured to receive transportation information only through the transceiver 320 or only from a mobile device as an electronic controller default so that only mobile devices or authorized interfaces (e.g., an electronic application interface for placing a shipping order or a shipping order placement website) can transmit transportation information to a transport container 110. In certain embodiments, only when the electronic controller 230 receives an ID 260, does the electronic controller 230 activate the user interface 325 as an option to provide transportation information to the electronic controller 230.

At step 815, the electronic controller determines whether the cavity 265 of the transport container 110 is occupied with one or more packages. If the electronic controller 230 determines that the cavity 265 of the transport container 110 is occupied with one or more packages, then the electronic controller 230 returns to idle at step 805. If the electronic controller 230 determines that the cavity 265 of the transport container 110 is unoccupied, then the electronic controller 230 proceeds to step 820.

In certain embodiments, determining whether the cavity 265 of the transport container 110 is occupied or unoccupied allows the transport container 110 to independently determine whether the transport container 110 is available to transport a package. For example, when the electronic controller 230 determines that its cavity 265 does not contain a package (e.g., the cavity 265 of the transport container 110 is unoccupied or is in an unoccupied state), the electronic controller 230 may determine that the transport container 110 is available or whether the transport container 110 is scheduled to transport another package (e.g., the cavity 265 of the transport container 110 is schedule to be occupied) based on order data stored in the memory 310. When the electronic controller 230 determines that the transport container 110 is scheduled to transport another package, the electronic controller 230 may ignore the transportation information, transmit the transportation information to another transport container 110, or independently determine its relative availability to transport the package compared to one or more other transport containers 110. When the electronic controller 230 determines that the transport container 110 is not scheduled to transport another package, the electronic controller 230 may determine that the transport container 110 is available for transporting the package.

At step 820, the electronic controller receives transport container data from one or more nearby transport containers 110. Transport container data from one or more nearby transport containers may include a delivery status of one or more nearby transport containers 110, an estimate availability time of the one or more nearby transport containers 110, GPS coordinates of the one or more nearby transport containers 110 when each of the one or more nearby transport containers 110 are available, an address of the one or more nearby transport containers 110 when each of the one or more nearby transport containers 110 are available, available communication resources of each of the one or more nearby transport containers 110, and storage dimensions of the cavity 265 of each of the one or more nearby transport containers 110. Receiving transport container data from one or more nearby transport containers 110 allows the electronic controller 230 to independently determine the transport container's relative availability compared to the other one or more available transport containers.

At step 825, the electronic controller 230 determines whether another available transport container will reach an initial location provided by the transport information first or before the transport container 110 is able to be at the initial location. If the electronic controller 230 determines that another available transport container will reach an initial location provided by the transport information first, then the electronic controller 230 returns to idle at step 805. If the electronic controller 230 determines that another available transport container will not reach the initial location provided by the transport information before the transport container 110 reaches the initial location, then the electronic controller 230 proceeds to step 830.

In certain embodiments, determining whether another available transport container will reach an initial location provided by the transport information first or before the transport container 110 is able to be at the initial location allows the transport container 110 to independently determine whether the transport container 110 should be used to perform a package transport based on the received transportation information. For example, in response to receiving transportation information, the transport container 110, using electronic controller 230, independently determines the transport container's own relative availability to transport a package compared to one or more other transport containers 110. A transport container 110 periodically receives transport container data from each of one or more transport containers 110 nearby or within a vicinity of the transport container 110 and stores the transport container data in the memory 310. The electronic controller 230 compares the received and stored transport container data with its own order data (e.g., of one or more shipping orders) and independently determines whether the transport container 110 is the most available to transport a package compared to the other transport containers 110. When the electronic controller 230 determines that the transport container 110 is the most available transport container 110 to transport a package, the electronic controller 230 performs one or more transport container labeling operations, as described herein.

At step 830, the electronic controller 230 determines a geographic route for an initial location to a destination location based on the received transportation information. Step 830 is at least similar to step 515 of method 500 illustrated in FIG. 5. At step 835, the electronic controller 230 displays or generates and transmits for display at least some of the received transportation information on a display screen. Step 835 is at least similar to step 520 of method 500 illustrated in FIG. 5. At step 840, the electronic controller 230 deploys the transport container 110 from the initial location along the geographic route. Step 840 is at least similar to step 525 of method 500 illustrated in FIG. 5. At step 845, the electronic controller 230 guides the transport container 110 along the geographic route until the transport container 110 reaches its destination location. Step 845 is at least similar to step 530 of method 500 illustrated in FIG. 5.

Figure 9:
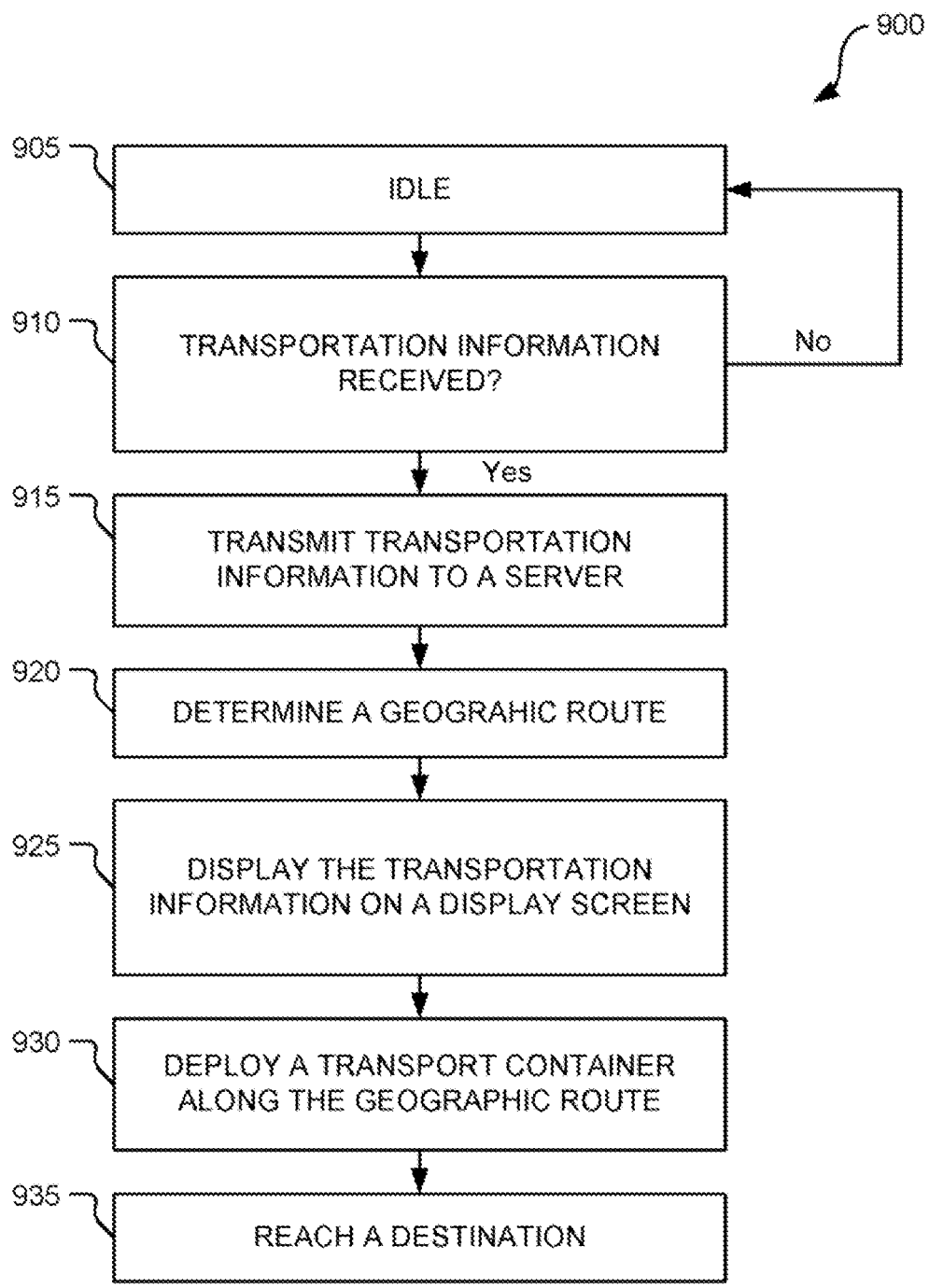
FIG. 9 illustrates another method implemented by an electronic controller of a transport container for performing transport container labeling operations according to certain embodiments of this disclosure.

FIG. 9 illustrates a method 900 implemented by an electronic controller 230 of a transport container 110 for performing transport container labeling operations according to certain embodiments of this disclosure. Although certain details will be provided with reference to the method 900 of FIG. 9, it should be understood that other embodiments may include more, less, or different method steps. At step 905, the electronic controller 230 of the transport container 110 is in an idle state at least with respect to performing transport container labeling operations. Step 905 is at least similar to step 505 of method 500 illustrated in FIG. 5. At step 910, the electronic controller 230 determines whether transportation information has been received. Step 910 is at least similar to step 510 of method 500 illustrated in FIG. 5.

At step 915, the electronic controller 230 transmits the received transportation information to server 125 to back up the transportation information received by the electronic controller. In some embodiments, the electronic controller 230 transmits some or all of the data stored in memory 310. This feature allows transportation data information and other data stored in the memory 310 to be quickly and easily accessed when a transport container failure occurs.

At step 920, the electronic controller 230 determines a geographic route for an initial location to a destination location based on the received transportation information. Step 920 is at least similar to step 515 of method 500 illustrated in FIG. 5. At step 925, the electronic controller 230 displays or generates and transmits for display at least some of the received transportation information on a display screen. Step 925 is at least similar to step 520 of method 500 illustrated in FIG. 5. At step 930, the electronic controller 230 deploys the transport container 110 from the initial location along the geographic route. Step 930 is at least similar to step 525 of method 500 illustrated in FIG. 5. At step 935, the electronic controller 230 guides the transport container 110 along the geographic route until the transport container 110 reaches its destination location. Step 935 is at least similar to step 530 of method 500 illustrated in FIG. 5.

Figure 10:
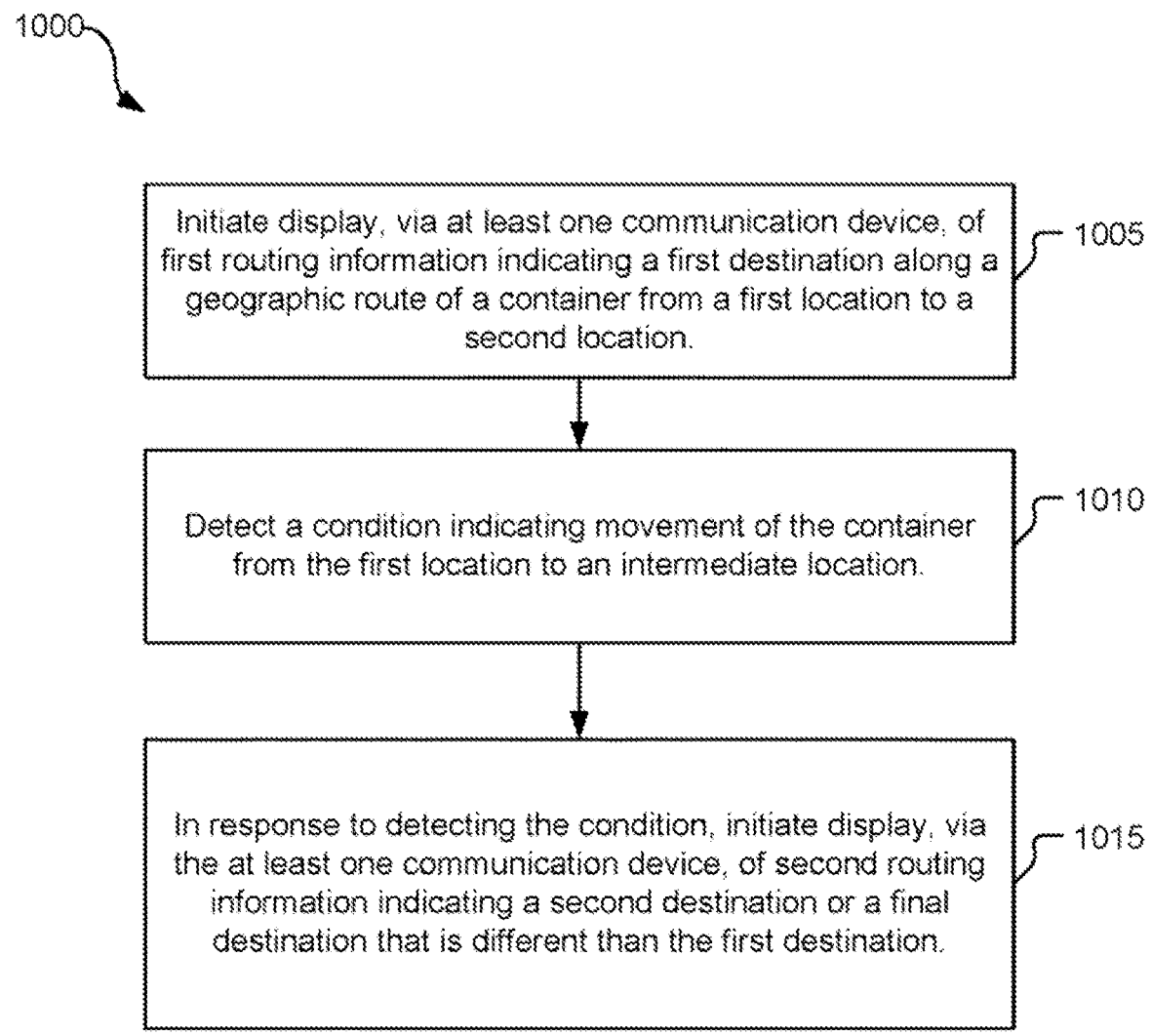
FIG. 10 illustrates a method implemented by processing circuitry of a container controller for performing operations associated with container labeling according to certain embodiments of this disclosure

FIG. 10 illustrates a method 1000 implemented by processing circuitry (e.g., electronic controller 230 of a transport container 110) for performing operations associated with container labeling according to certain embodiments of this disclosure. Although certain details are provided with reference to the method 1000 of FIG. 10, it should be understood that other embodiments may include more, less, or different method steps. At step 1005, the processing circuitry initiates display, via at least one communication device, of first routing information indicating a first destination along a geographic route of a container from a first location to a second location. At step 1010, the processing circuitry detects a condition indicating movement of the container from the first location to an intermediate location. In response to detecting the condition, the processing circuitry at step 1015 initiates display, via the at least one communication device, of second routing information indicating a second destination or a final destination that is different than the first destination.

Figure 11:
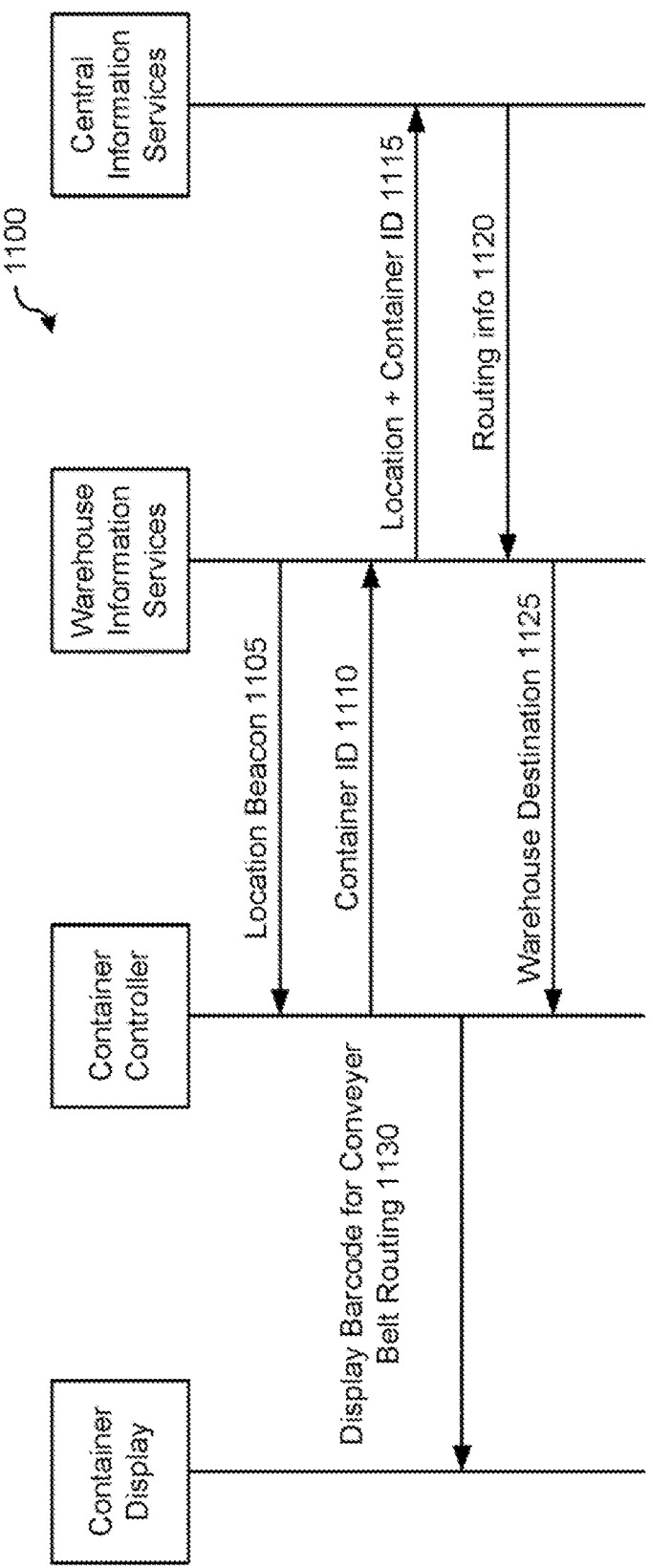
FIG. 11 illustrates operations of an example of a method of container labeling according to certain embodiments of this disclosure.

FIG. 11 illustrates a method 1100 of performing operations associated with transport container labeling according to certain embodiments of this disclosure. Although certain details are provided with reference to the method 1100, it should be understood that other embodiments may include more, less, or different method steps. In an example warehouse (or distribution center) scenario, a container controller (e.g., an electronic controller 230 of a transport container 110 at a warehouse) receives a location beacon 1105 from a warehouse information services unit (e.g., server). In response to receiving the location beacon 1105, the container controller transmits a container ID 1110 to the warehouse information services unit. The warehouse information services unit then transmits location and container ID information at 1115 to a central information services unit (e.g., server), which in response transmits routing information at 1120 to the warehouse information services unit. In response to receiving the routing information at 1120, the warehouse information services unit transmits warehouse destination information at 1125 to the container controller, which in response transmits a signal at 1130 instructing a device (e.g., a container display of the transport container 110) to display a code (e.g., a barcode) for conveyer belt routing of the container within the warehouse. The warehouse destination information 1125 may indicate, for example, one or both of an isle and a bin. In the case of a distribution center scenario, the information may include destination center information indicating, for example, one or both of a dock and a truck.

Figure 12:
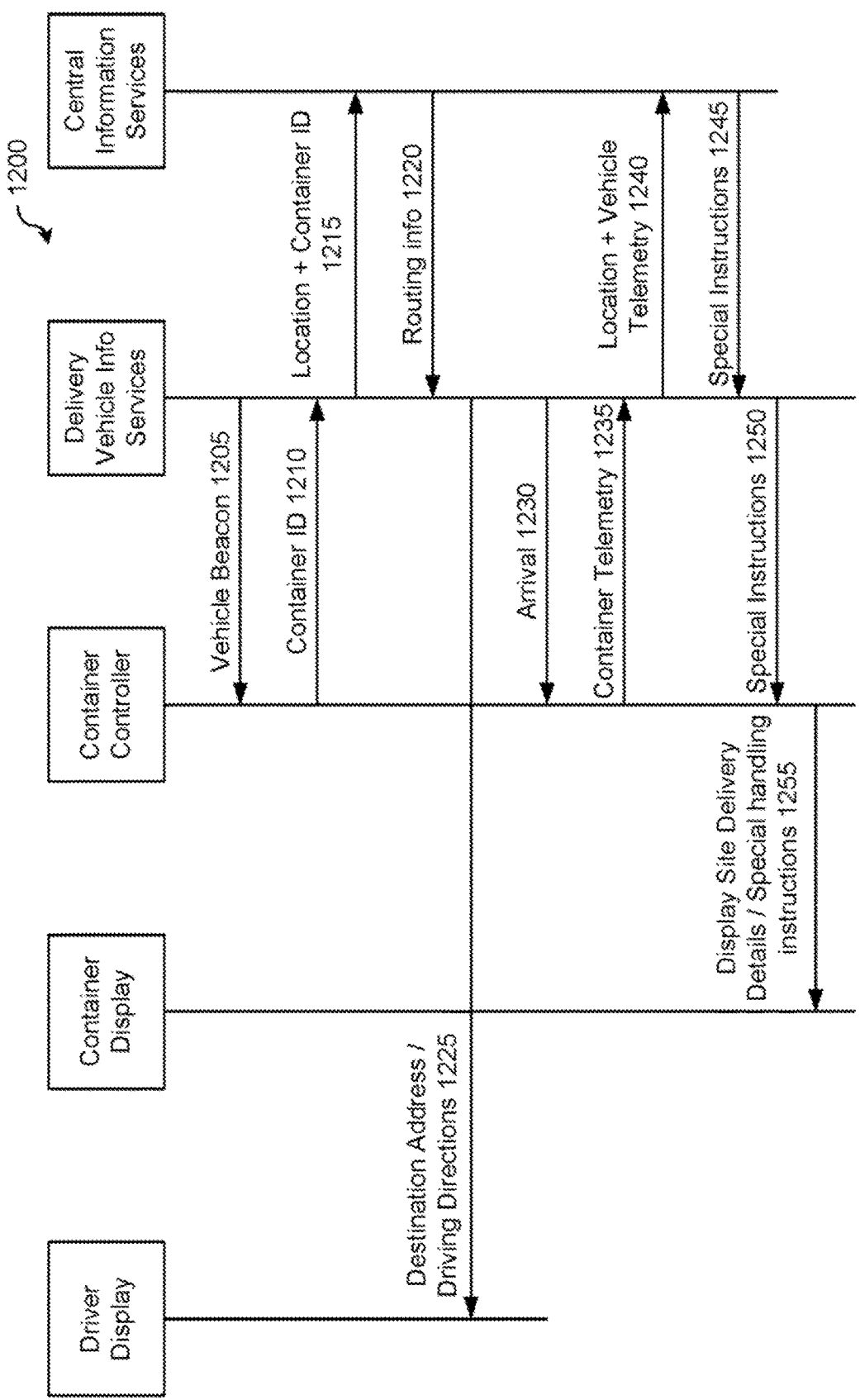
FIG. 12 illustrates operations of an example of a method of container labeling according to certain embodiments of this disclosure.

FIG. 12 illustrates a method 1200 of performing operations associated with transport container labeling according to certain embodiments of this disclosure. Although certain details are provided with reference to the method 1200, it should be understood that other embodiments may include more, less, or different method steps. In an example delivery scenario, which may transpire after the warehouse scenario, a container controller (e.g., an electronic controller 230 of a transport container 110 out for delivery) receives a vehicle beacon at 1205 from a delivery vehicle information service unit (e.g., server). In response to receiving the delivery beacon at 1205, the container controller transmits a container ID at 1210 to the delivery vehicle information service unit. The delivery vehicle information service unit then transmits location and container ID information 1215 to a central information services unit (e.g., server), which in response transmits routing information at 1220 to the delivery vehicle information service unit. In response to receiving the routing information at 1220, the delivery vehicle information service unit transmits destination address and/or driving directions information at 1225 to a device external to or detached from the container (e.g., a driver display). Subsequently, the delivery vehicle information service unit transmits a signal to the container control indicating or associated with arrival information at 1230 (e.g., a request for telemetry information) followed by the container controller transmitting container telemetry information at 1235 to the delivery vehicle information service unit. The delivery vehicle information service unit then transmits container and vehicle telemetry information (e.g., recorded information indicating exposures of the container during transit to one or more of shock, vibration, or temperature and the natures of the exposures (or a subgroup of the exposures), such as time, magnitude, frequency, etc. of each metric for exposures that exceed threshold magnitude or frequency values) at 1240 to the central information services unit, which in response may transmit delivery instructions at 1245 (e.g., special handling instructions) to the delivery vehicle information service unit. The delivery vehicle information service unit transmits the delivery instructions (e.g. based on the telemetry information) at 1245 to the container controller, followed by the container controller transmitting display site delivery details and/or the delivery instructions to the container display. For example, if the telemetry information indicates that the container has been exposed to relatively high temperature (e.g., in magnitudes or duration), the delivery instructions may indicate a reduced expiration time or date. In another example, the delivery instructions may indicate information not associated directly with the telemetry information, such as instructions for a delivery person (e.g., the delivery driver) to leave the package with a particular neighbor if the recipient for the container cannot be reached (e.g., is not home). In another example, the delivery instructions may be based on the telemetry information or other information indicating that contents of the container may be damaged, and the delivery instructions may indicate a request that the recipient open the container, inspect the contents, and decide to accept or refuse the delivery (or to accept the contents at a discounted price) based on the inspection; if the contents are refused, the recipient may elect to have a refund or a re-order initiated at the time of the inspection. In certain embodiments, any portions or all of the functionality of the central information services unit may be incorporated, alternatively or additionally, into the container (and/or other containers in communication with the container) and/or into user/merchant mobile communication devices.

Figure 13:
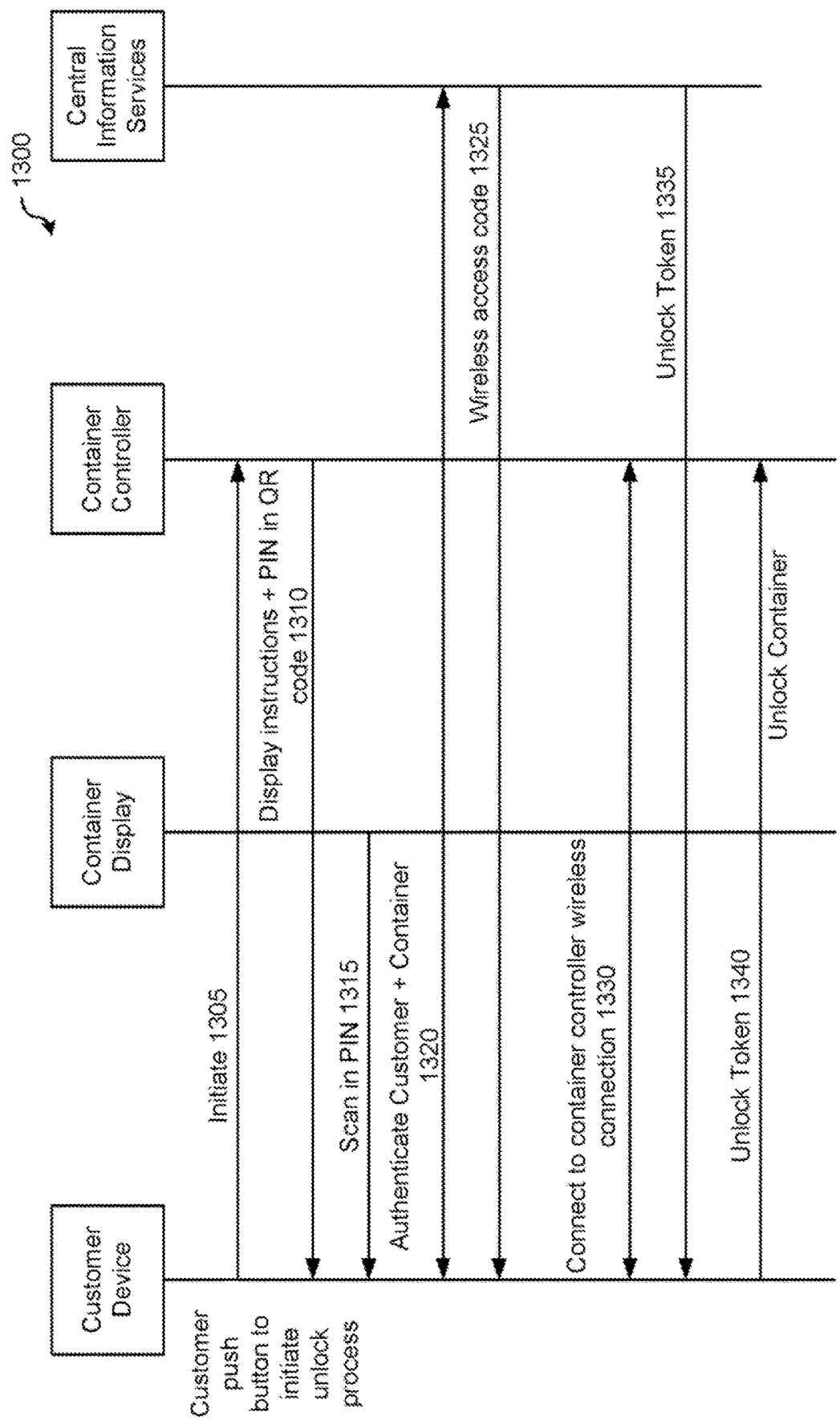
FIG. 13 illustrates operations of an example of a method of container labeling according to certain embodiments of this disclosure.

FIG. 13 illustrates a method 1300 of performing operations associated with transport container labeling according to certain embodiments of this disclosure. Although certain details are provided with reference to the method 1300, it should be understood that other embodiments may include more, less, or different method steps. In an example customer unlock container scenario, which may transpire after the delivery scenario, a customer (e.g., a recipient of a transport container 110 at a final destination of the transport container 110) interacts with a container or with a customer device external to or detached from the container (e.g., pushes a button on the container at the final destination) to initiate an unlock process of the container. In response to the interaction, a first signal at 1305 (e.g., a customer activation signal) is transmitted (e.g., from the container or the customer device) to a container controller (e.g., an electronic controller 230 of the transport container 110). In response to receiving the first signal 1305, the container controller transmits a second signal at 1310 (e.g., including PIN or QR code information) to a device associated with the container (e.g., a container display) instructing the device to display instructions and/or a code (e.g., the PIN and/or QR code). The container controller may additionally or alternatively transmit the second signal 1310 or information associated with the second signal to the customer device. In response to receiving the second signal at 1310, the container display transmits a scan in PIN at 1315 to the customer device, followed by an authentication signaling at 1320 transpiring between the customer device and/or container and the central information services unit. In response to the authentication signaling at 1320 (e.g., upon authentication of the customer device with the central information services unit) the central information services unit transmits a wireless access code at 1325 to the customer device, followed by third signals at 1330 being communicated between the customer device and the container controller (e.g., to establish a wireless connection between customer device and the container controller). The customer device, after receiving an unlock token information at 1335 from the central information services unit, transmits an unlock token 1340 to the container controller.

Figure 14:
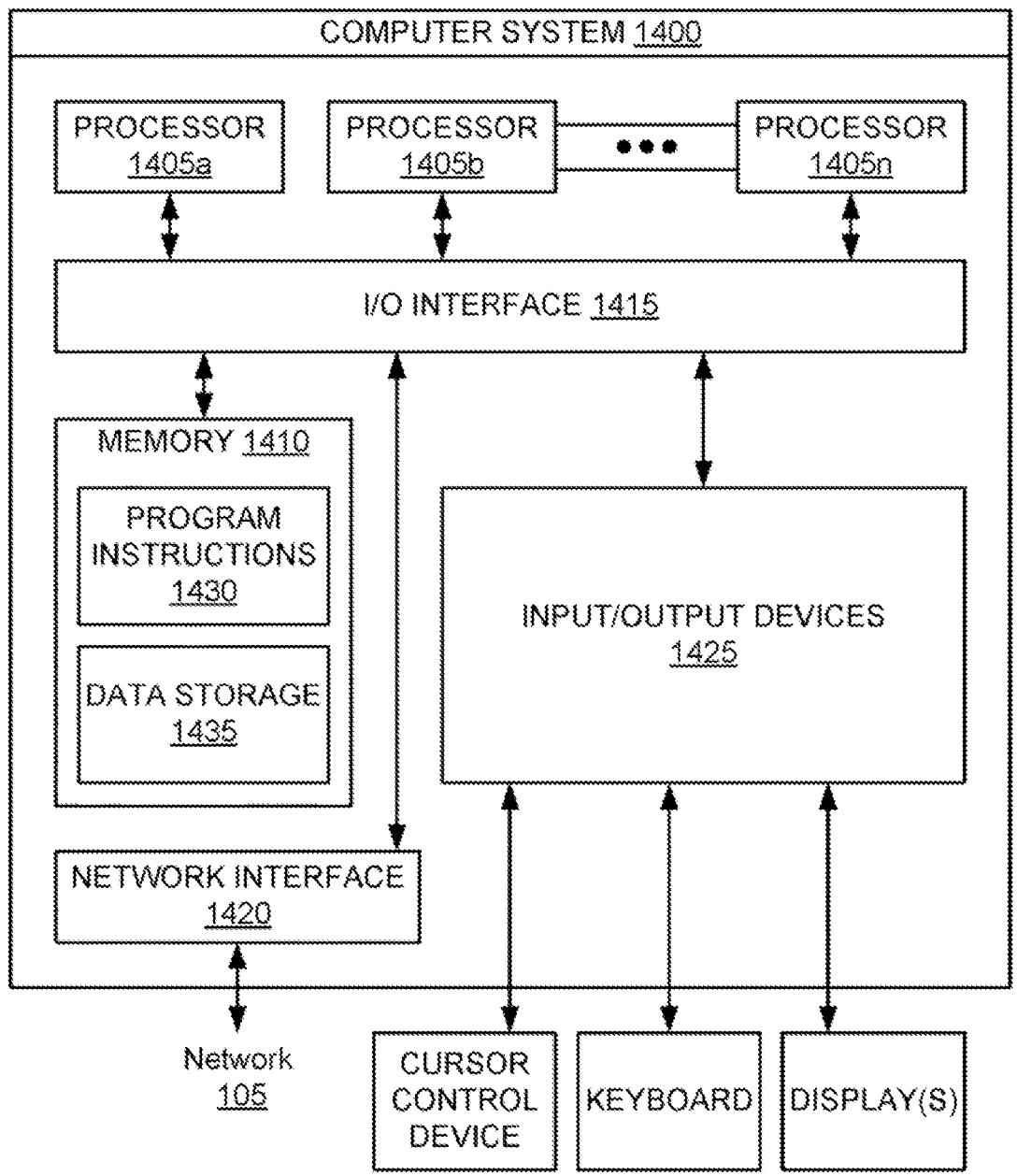
FIG. 14 illustrates a non-limiting, example computer system configured to implement aspects of systems and methods according to certain embodiments of this disclosure.

FIG. 14 illustrates a non-limiting, example of a computer system 1400 configured to implement systems and methods for labeling a transport container according to certain embodiments of this disclosure. FIG. 14 illustrates the computer system 1400 that is configured or configurable to execute any and all of the embodiments described herein. In certain embodiments, the computer system 1400 describes at least some of the components of the electronic device 115 illustrated in FIG. 1. In certain embodiments, the computer system 1400 describes at least some of the components of the server 125 illustrated in FIG. 1. In certain embodiments, the computer system 1400 describes at least some of the components of the electronic controller 230 illustrated in FIGS. 2 and 3. In different embodiments, the computer system 1400 may be any of various types of devices, including, but not limited to, a computer embedded in a vehicle, a computer embedded in an appliance, a personal computer system, a desktop computer, a handset (e.g., a laptop computer, a notebook computer, a tablet, a slate, a netbook computer, a camera, a handheld video game device, a handheld computer, a video recording device, a consumer device, a portable storage device, or the like), a mainframe computer system, a workstation, network computer, a set top box, a video game console, a mobile device (e.g., electronic controller 230 of a transport container, a handset, or the like), an application server, a storage device, a television, a peripheral device such as a switch, modem, router, or in general any type of computing or electronic device.

Various embodiments of a system and method for transport container labeling, as described herein, may be executed on one or more computer systems (such as computer system 1400), which may interact with various other devices. In the illustrated embodiment, the computer system 1400 includes one or more processors 1405 coupled to a system memory 1410 via an input/output (I/O) interface 1415. The computer system 1400 further includes a network interface 1420 coupled to I/O interface 1415, and one or more input/output devices 1425, such as cursor control device, keyboard, and display(s). In some cases, it is contemplated that embodiments may be implemented using a single instance of computer system 1400, while in other embodiments multiple such systems, or multiple nodes making up computer system 1400, may be configured to host different portions or instances of embodiments. For example, in one embodiment some elements may be implemented via one or more nodes of computer system 1400 that are distinct from those nodes implementing other elements.

In various embodiments, computer system 1400 may be a uniprocessor system including one processor 1405*a*, or a multiprocessor system including several processors 1405*a*-1405*n* (e.g., two, four, eight, or another suitable number). The processors 1405 may be any suitable processor capable of executing instructions. For example, in various embodiments the processors 1405 may be general-purpose or embedded processors implementing any of a variety of instruction set architectures (ISAs), such as the x86, PowerPC, SPARC, or MIPS ISAs, or any other suitable ISA. In multiprocessor systems, each of processors 1205 may commonly, but not necessarily, implement the same ISA.

The system memory 1410 may be configured to store the program instructions 1430 and/or existing state information and ownership transition condition data in the data storage 1435 accessible by the processor 1405. In various embodiments, the system memory 1410 may be implemented using any suitable memory technology, such as static random access memory (SRAM), synchronous dynamic RAM (SDRAM), nonvolatile/Flash-type memory, or any other type of memory. In the illustrated embodiment, the program instructions 1430 may be configured to implement a system for package delivery incorporating any of the functionality, as described herein. In some embodiments, program instructions and/or data may be received, sent, or stored upon different types of computer-accessible media or on similar media separate from the system memory 1410 or the computer system 1400. The computer system 1400 is described as implementing at least some of the functionality of functional blocks of previous figures.

In one embodiment, the I/O interface 1415 may be configured to coordinate I/O traffic between the processor 1405, the system memory 1410, and any peripheral devices in the device, including the network interface 1420 or other peripheral interfaces, such as the input/output devices 1425. In some embodiments, the I/O interface 1415 may perform any necessary protocol, timing, or other data transformations to convert data signals from one component (e.g., the system memory 1410) into a format suitable for use by another component (e.g., the processor 1405). In some embodiments, the I/O interface 1415 may include support for devices attached through various types of peripheral buses, such as a variant of the Peripheral Component Interconnect (PCI) bus standard or the Universal Serial Bus (USB) standard, for example. In some embodiments, the function of the I/O interface 1415 may be split into two or more separate components, such as a north bridge and a south bridge, for example. Also, in some embodiments some or all of the functionality of the I/O interface 1415, such as an interface to the system memory 1410, may be incorporated directly into the processor 1405.

The network interface 1420 may be configured to allow data to be exchanged between the computer system 1400 and other devices attached to the network 105 (e.g., carrier or agent devices) or between nodes of the computer system 1400. The network 105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 1420 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The input/output devices 1425 may, in some embodiments, include one or more display terminals, keyboards, keypads, touchpads, scanning devices, voice, or optical recognition devices, or any other devices suitable for entering or accessing data by one or more the computer systems 1400. Further, various other sensors may be included in the I/O devices 1425, such as imaging sensors, barometers, altimeters, LIDAR, or any suitable environmental sensor. Multiple input/output devices 1425 may be present in the computer system 1400 or may be distributed on various nodes of the computer system 1400. In some embodiments, similar input/output devices may be separate from the computer system 1400 and may interact with one or more nodes of the computer system 1400 through a wired or wireless connection, such as over the network interface 1420.

As shown in FIG. 14, the system memory 1410 may include program instructions 1430, which may be processor-executable to implement any element or action, as described herein. In one embodiment, the program instructions may implement at least a portion of methods described herein, such as the methods illustrated by FIGS. 5-9. In other embodiments, different elements and data may be included. Note that the data storage 1435 may include any data or information, as described herein.

Those skilled in the art will appreciate that the computer system 1400 is merely illustrative and is not intended to limit the scope of embodiments. In particular, the computer system and devices may include any combination of hardware or software that can perform the indicated functions, including computers, network devices, Internet appliances, PDAs, wireless phones, pagers, GPUs, specialized computer systems, information handling apparatuses, or the like. The computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available. Those skilled in the art will appreciate that any component or functionality, or any portion thereof, described or referenced herein may be included, coupled, used, adapted, made compatible, or otherwise incorporated, individually or in any combination or permutation, with any container, structure, parcel, package, or process.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described here. In some embodiments, instructions stored on a computer-accessible medium separate from the computer system 1400 may be transmitted to the computer system 1400 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or nonvolatile media such as RAM (e.g., SDRAM, DDR, RDRAM, SRAM, or the like), ROM, or the like. A "non-transitory" computer readable medium excludes wired, wireless, optical, or other communication links that transport transitory electrical or other signals. A non-transitory computer readable medium includes media where data can be permanently stored (such as any computer memory device) and media where data can be stored and later overwritten, such as a rewritable optical disc or an erasable memory device. In some embodiments, a computer-accessible medium may include transmission media or signals such as electrical, electromagnetic, or digital signals, conveyed via a communication medium such as network and/or a wireless link.

Thus, the disclosure provides, among other things, a system for package delivery, including a transport container labeling system. The transport container labeling system is configured for determining a geographic route based on transportation information, displaying the transportation information, and deploying a transport container along the geographic route. Various features and advantages of the disclosure are set forth in the following claims.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A container, comprising:
a body, wherein the body includes a cavity for storage of cargo; and
processing circuitry coupled to the body, wherein the processing circuitry is configured to:
receive transportation information for first cargo; and
in response to a first determination indicating that the container is available for transportation of the first cargo, determine a route for delivery of the first cargo and send a command to cause a transmitter to transmit a signal to cause the container to be deployed from a first location to a second location of the route to receive the first cargo.

2. The container of claim 1, wherein the processing circuitry is further configured to send a second command to the transmitter to cause the transmitter to send data to a communication device to enable the communication device to display a location of the container along the route.

3. The container of claim 1, wherein, in response to the first determination indicating that the container is not available for transportation of the first cargo, the processing circuitry is further configured to send a second command to the transmitter to transmit the transportation information to another container.

4. The container of claim 1, wherein the processing circuitry further is configured to make the first determination based on a schedule for use of the container, based on sensor data associated with the cavity, based on a lock status of a cover for the cavity, or combinations thereof.

5. The container of claim 4, wherein the first determination indicates the container is not available when the schedule indicates that the container is scheduled to transport other cargo.

6. The container of claim 4, wherein the first determination indicates that the container is available when the schedule indicates that the container is not scheduled to transport other cargo and the sensor data indicates that the cavity does not contain cargo.

7. The container of claim 4, wherein the first determination indicates that the container is not available when the lock status is in a locked state.

8. The container of claim 1, wherein the processing circuitry is configured to make the first determination based on a second determination of a relative availability of the container compared to one or more other transport containers.

9. The container of claim 8, wherein the second determination is based on comparison of delivery status, estimated time of availability, location when available, storage dimensions, or combinations thereof, for the container and the one or more other transport containers.

10. The container of claim 1, wherein the signal is sent to a transport vehicle to enable pickup of the container and movement of the container to the second location.

11. A method comprising:
receiving, at processing circuitry of a container, transportation information for first cargo; and
determining, at the processing circuitry, availability of the container to transport the first cargo based on a schedule for use of the container, based on sensor data associated with a cavity of the container, based on a lock status of a cover for the cavity, or combinations thereof; and
in response to a determination that the container is available to transport the first cargo:
determining, via the processing circuitry, a route for delivery of the first cargo; and
sending a command from the processing circuitry to a transceiver to cause the transceiver to transmit a first signal to cause the container to be deployed from a first location to a second location of the route to receive the first cargo.

12. The method of claim 11, further comprising sending a second command from the processing circuitry to the transceiver to cause the transceiver to transmit a second signal that indicates acceptance of transportation of the first cargo by the container in response to the determination indicating that the container is available to transport the first cargo.

13. The method of claim 11, further comprising validating, via the processing circuitry, the transportation information based on biometric information.

14. The method of claim 11, wherein the determining the availability of the container to transport the first cargo is further based on a second determination, performed by the processing circuitry, of relative availability of the container compared to one or more other containers.

15. The method of claim 14, wherein the second determination is based on comparison of delivery status, estimated time of availability, location when available, storage dimensions, or combinations thereof, for the container and the one or more other containers.

16. A non-transitory computer-readable medium comprising instructions, wherein the non-transitory computer-readable medium is coupled to processing circuitry of a container, and wherein the instructions, when executed by the processing circuitry, cause the processing circuitry to:
receive transportation information for first cargo; and
in response to a first determination indicating that the container is available for transportation of the first cargo, determine a route for delivery of the first cargo and send a command to cause a transmitter to transmit a signal to cause the container to be deployed from a first location to a second location of the route to receive the first cargo.

17. The non-transitory computer-readable medium of claim 16, wherein the instructions, when executed by the processing circuitry, further cause the processing circuitry to transmit a second signal that indicates acceptance of transportation of the first cargo by the container in response to the first determination indicating that the container is available for transportation of the first cargo.

18. The non-transitory computer-readable medium of claim 16, wherein the processing circuitry is configured to make the first determination based on a schedule for use of the container, based on sensor data associated with a cavity of the container, based on a lock status of a cover for the cavity, or combinations thereof.

19. The non-transitory computer-readable medium of claim 16, wherein the transportation information is received via a user interface coupled to the container, a communication link with an external device, or both.

20. The non-transitory computer-readable medium of claim 16, wherein the signal is sent to a transport vehicle to enable pickup of the container and movement of the container to the second location.

* * * * *